US008329600B2

(12) United States Patent
Gu et al.

(10) Patent No.: US 8,329,600 B2
(45) Date of Patent: *Dec. 11, 2012

(54) METHOD AND SYSTEM FOR HIGH-SPEED PRECISE LASER TRIMMING AND SCAN LENS FOR USE THEREIN

(75) Inventors: Bo Gu, Andover, MA (US); Jonathan S. Ehrmann, Sudbury, MA (US); Joseph V. Lento, Methuen, MA (US); Bruce L. Couch, North Attleboro, MA (US); Yun Fee Chu, Natick, MA (US); Shepard D. Johnson, Andover, MA (US)

(73) Assignee: GSI Group Corporation, Bedford, MA (US)

( * ) Notice: Subject to any disclaimer, the term of this patent is extended or adjusted under 35 U.S.C. 154(b) by 602 days.

This patent is subject to a terminal disclaimer.

(21) Appl. No.: 12/499,123

(22) Filed: Jul. 8, 2009

(65) Prior Publication Data
US 2009/0321396 A1    Dec. 31, 2009

Related U.S. Application Data

(60) Division of application No. 11/657,810, filed on Jan. 25, 2007, now Pat. No. 7,563,695, and a continuation-in-part of application No. 11/376,527, filed on Mar. 15, 2006, now abandoned, which is a continuation-in-part of application No. 11/245,282, filed on Oct. 6, 2005, now Pat. No. 7,358,157, and a continuation-in-part of application No. 11/131,668, filed on May 18, 2005, now Pat. No. 7,407,861, which is a division of application No. 10/397,541, filed on Mar. 26, 2003, now Pat. No. 6,951,995, which is a continuation-in-part of application No. 10/108,101, filed on Mar. 27, 2002, now Pat. No. 6,972,268.

(60) Provisional application No. 60/763,242, filed on Jan. 30, 2006, provisional application No. 60/617,130, filed on Oct. 8, 2004.

(51) Int. Cl.
*H01L 21/26*    (2006.01)
(52) U.S. Cl. ........ 438/795; 438/459; 438/460; 438/463; 438/487; 438/797; 219/121.67; 219/121.69; 219/121.72; 219/121.71; 257/E21.347
(58) Field of Classification Search .................. None
See application file for complete search history.

(56) References Cited

U.S. PATENT DOCUMENTS 4,429,298 A    1/1984    Oberholzer
(Continued)

FOREIGN PATENT DOCUMENTS

JP    2003-133690    5/2003
(Continued)

OTHER PUBLICATIONS

Aghamirzadeh, Maryam, "Choosing the Right Laser for Trim Quality, Hybrid Circuit Technology," Electro Scientific Industries, Inc., Portland, Oregon, Jul. 1985, pp. 18-19.

*Primary Examiner* — Kyoung Lee
(74) *Attorney, Agent, or Firm* — Brooks Kushman P.C.

(57)    ABSTRACT

A method, system and scan lens for use therein are provided for high-speed, laser-based, precise laser trimming at least one electrical element along a trim path. The method includes generating a pulsed laser output with a laser, the output having one or more laser pulses at a repetition rate. A fast rise/fall time, pulse-shaped q-switched laser or an ultra-fast laser may be used. Beam shaping optics may be used to generate a flat-top beam profile. Each laser pulse has a pulse energy, a laser wavelength within a range of laser wavelengths, and a pulse duration. The wavelength is short enough to produce desired short-wavelength benefits of small spot size, tight tolerance, high absorption and reduced or eliminated heat-affected zone (HAZ) along the trim path, but not so short so as to cause microcracking. In this way, resistance drift after the trimming process is reduced.

37 Claims, 16 Drawing Sheets

U.S. PATENT DOCUMENTS

| | | | |
|---|---|---|---|
| 4,511,607 A | 4/1985 | White | |
| 4,647,899 A | 3/1987 | Moy | |
| 4,853,671 A | 8/1989 | Iversen et al. | |
| 4,901,052 A | 2/1990 | Chapel, Jr. et al. | |
| 5,087,987 A | 2/1992 | Simbal | |
| 5,111,325 A | 5/1992 | DeJager | |
| 5,404,247 A | 4/1995 | Cobb et al. | |
| 5,633,736 A | 5/1997 | Griffith et al. | |
| 5,796,392 A | 8/1998 | Eglit | |
| 5,835,280 A | 11/1998 | Griffith | |
| 5,838,355 A | 11/1998 | Narayan et al. | |
| 5,969,877 A | 10/1999 | Maeda | |
| 6,031,561 A | 2/2000 | Narayan et al. | |
| 6,281,471 B1 | 8/2001 | Smart | |
| 6,294,778 B1 | 9/2001 | Cappiello | |
| 6,322,711 B1 | 11/2001 | Chen | |
| 6,340,806 B1 | 1/2002 | Smart et al. | |
| 6,462,306 B1 | 10/2002 | Kitai et al. | |
| 6,495,791 B2 | 12/2002 | Hunter et al. | |
| 6,534,743 B2 | 3/2003 | Swenson et al. | |
| 6,573,473 B2 | 6/2003 | Hunter et al. | |
| 6,639,177 B2 | 10/2003 | Ehrmann et al. | |
| 6,662,063 B2 | 12/2003 | Hunter et al. | |
| 6,951,995 B2 * | 10/2005 | Couch et al. | 219/121.67 |
| 6,989,508 B2 | 1/2006 | Ehrmann et al. | |
| 7,015,418 B2 | 3/2006 | Cahill et al. | |
| 7,027,155 B2 | 4/2006 | Cordingley et al. | |
| 7,119,351 B2 | 10/2006 | Woelki | |
| 7,148,447 B2 | 12/2006 | Ehrmann et al. | |
| 7,176,407 B2 | 2/2007 | Hunter et al. | |
| 7,192,846 B2 | 3/2007 | Cordingley et al. | |
| 7,358,157 B2 * | 4/2008 | Gu et al. | 438/463 |
| 2002/0167581 A1 | 11/2002 | Cordingley et al. | |
| 2004/0134894 A1 | 7/2004 | Gu et al. | |
| 2004/0144760 A1 | 7/2004 | Cahill et al. | |
| 2004/0188399 A1 | 9/2004 | Smart | |
| 2005/0199598 A1 | 9/2005 | Hunter et al. | |
| 2005/0233537 A1 | 10/2005 | Couch et al. | |
| 2006/0028655 A1 | 2/2006 | Cordingley et al. | |
| 2006/0086702 A1 | 4/2006 | Smart | |
| 2006/0108337 A1 | 5/2006 | Gu et al. | |
| 2006/0151704 A1 | 7/2006 | Cordingley | |
| 2006/0186096 A1 | 8/2006 | Schramm | |
| 2006/0189091 A1 | 8/2006 | Gu | |
| 2006/0191884 A1 | 8/2006 | Johnson et al. | |
| 2006/0192845 A1 | 8/2006 | Cordingley et al. | |
| 2006/0199354 A1 | 9/2006 | Gu | |
| 2006/0205121 A1 | 9/2006 | Couch et al. | |
| 2006/0207975 A1 | 9/2006 | Ehrmann et al. | |
| 2006/0216927 A1 | 9/2006 | Cordingley et al. | |
| 2006/0256181 A1 | 11/2006 | Ehrmann et al. | |
| 2007/0031993 A1 | 2/2007 | Nemets et al. | |
| 2007/0052791 A1 | 3/2007 | Cordingley et al. | |
| 2007/0075058 A1 | 4/2007 | Ehrmann et al. | |
| 2007/0106416 A1 | 5/2007 | Griffiths et al. | |
| 2007/0117227 A1 | 5/2007 | Gu | |
| 2007/0173075 A1 | 7/2007 | Lee et al. | |
| 2007/0199927 A1 | 8/2007 | Gu et al. | |
| 2007/0215575 A1 | 9/2007 | Gu et al. | |
| 2007/0215820 A1 | 9/2007 | Cordingley et al. | |
| 2008/0011852 A1 | 1/2008 | Gu et al. | |
| 2008/0035614 A1 | 2/2008 | Smart | |
| 2008/0067155 A1 | 3/2008 | Gu | |
| 2008/0073438 A1 | 3/2008 | Gu et al. | |
| 2008/0094640 A1 | 4/2008 | Cordingley et al. | |

FOREIGN PATENT DOCUMENTS

JP     2004-235495 A     8/2004

* cited by examiner

| Cut Type | Name | Application | Resistor Geometry | Tolerance Expected | Stability | Speed |
|---|---|---|---|---|---|---|
| 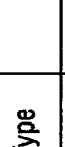 | Plunge | Medium value change; 10-30% range of adjustment | Top Hat or square | 1% | Fair | Fast |
| 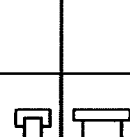 | L-cut | Medium - high value change; 10-60% range of adjustment | Rectangle | <1% | Very good | Medium |
| 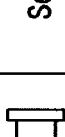 | Serpentine | High-value change; | Rectangle | 1% | Poor | Slow |
| 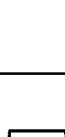 | Double plunge | Medium value change; good accuracy | Rectangle | <1% | Good | Medium |
|  | Measure predict L-cut | Medium - high value change; high accuracy | Rectangle | 0.5% | Very good | Slow |
|  | Measure predict plunge | Low - medium value change with good accuracy | Top Hat or square | <1% | Fair | Slow |
|  | Curved L | Medium value change; reduced hot spot at turn | Rectangle | <1% | Very good | Medium |
|  | Curved J | Similar to curved-L, high accuracy | Rectangle | <1% | Very good | Medium |
| 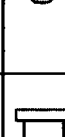 | Curve U | Medium value change | Rectangle | 1% | Very good | Slow |
|  | Curved U with isolation cuts | Used in high-voltage applications | Rectangle | 1% | Good | Slow |
| 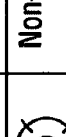 | Non-orthoganal plunge | Pot trimming | Circular | ------- | Fair | Slow |

*Fig. 1c (PRIOR ART)*

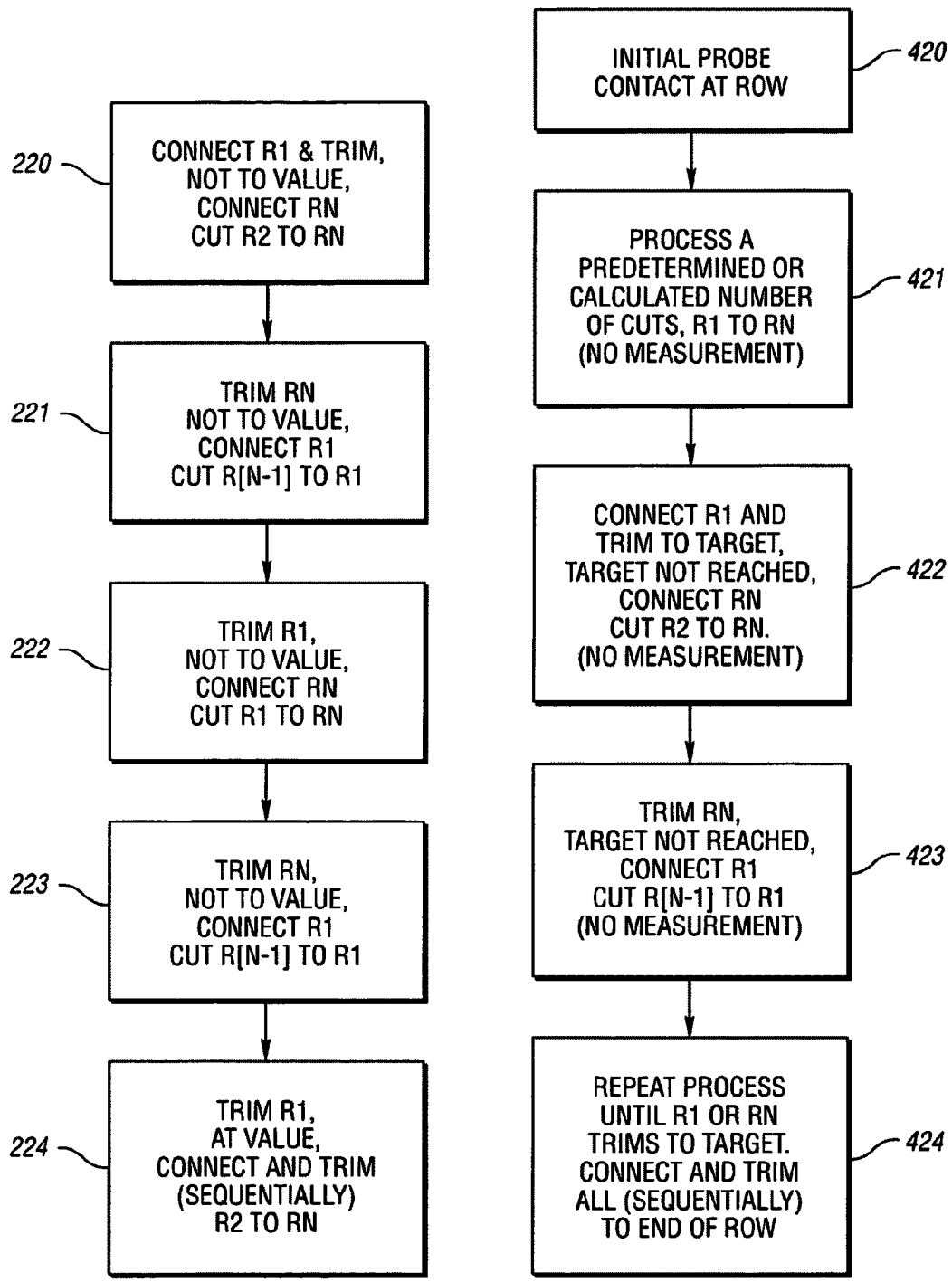

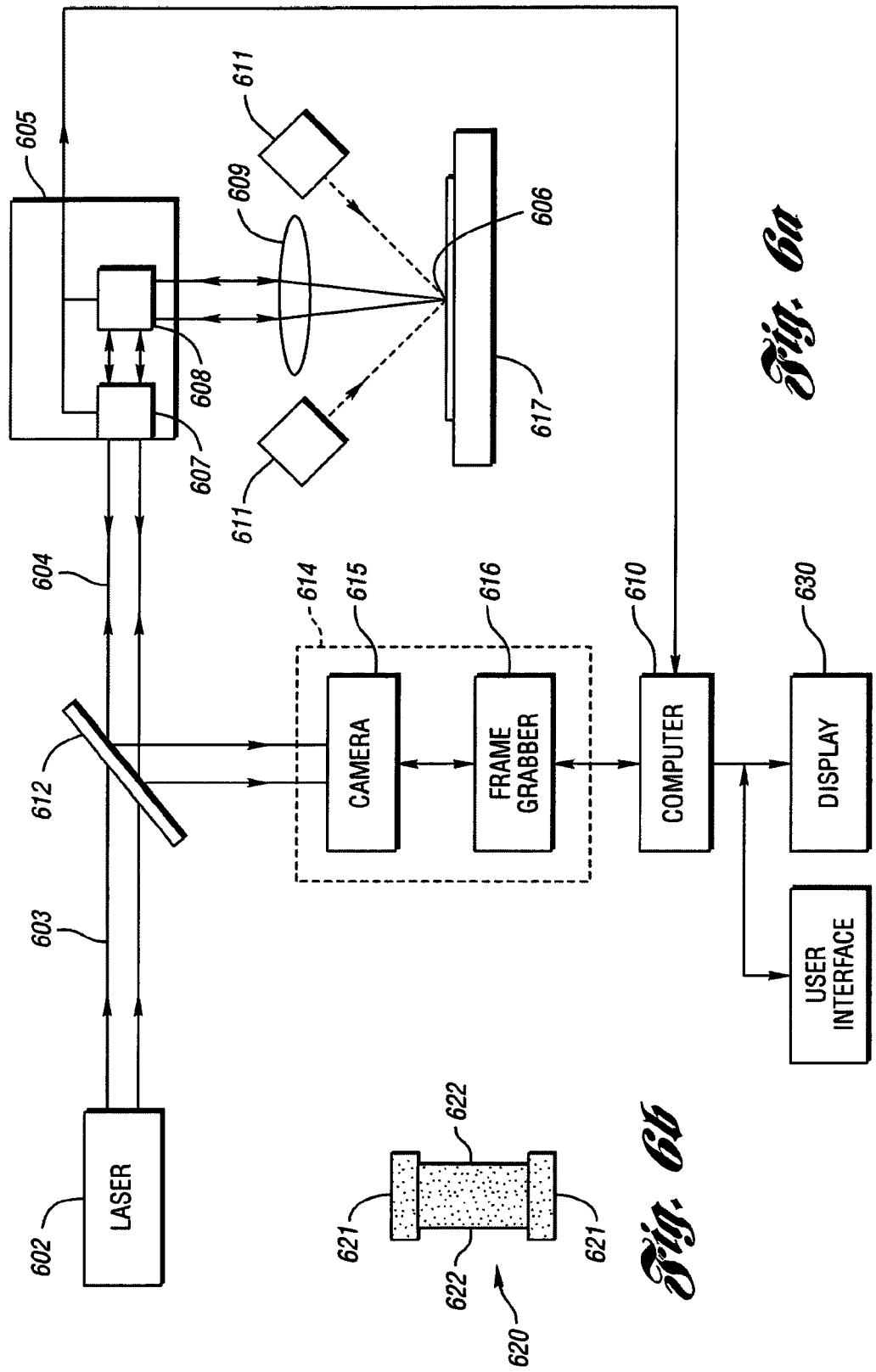

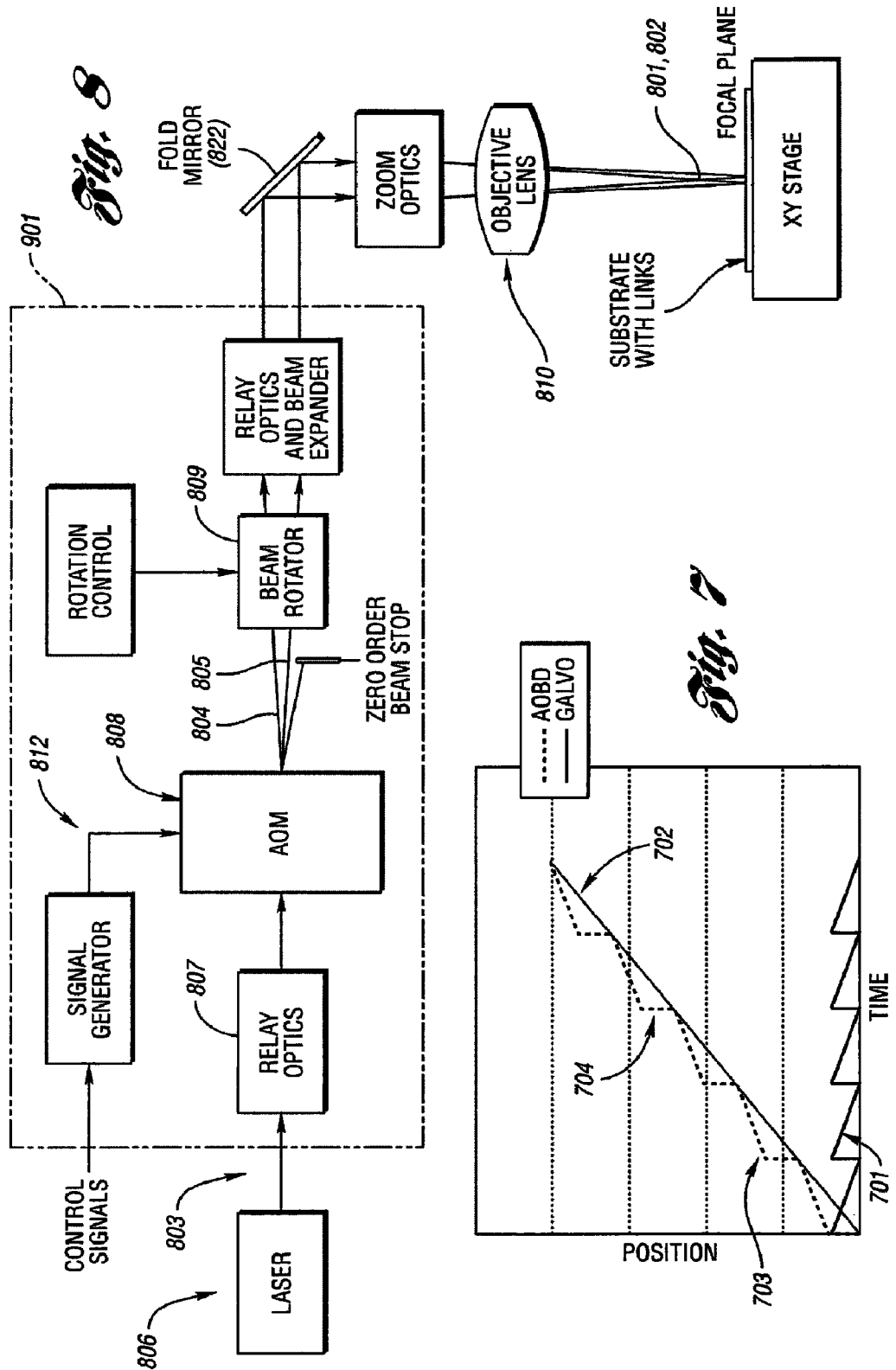

METHOD AND SYSTEM FOR HIGH-SPEED PRECISE LASER TRIMMING AND SCAN LENS FOR USE THEREIN

CROSS-REFERENCE TO RELATED APPLICATIONS

This application is a divisional application of Ser. No. 11/657,810, filed Jan. 26, 2007, entitled "Method And System For High-Speed Precise Laser Trimming And Scan Lens For Use Therein" which claims the benefit of U.S. Provisional Application Ser. No. 60/763,242, filed Jan. 30, 2006, entitled "Method and System for High-Speed Precise Laser Trimming, Scan Lens System for Use Therein and Electrical Device Produced Thereby." This application claims priority to and is a continuation-in-part of U.S. patent application Ser. No. 11/376,527, filed Mar. 15, 2006, entitled "Method and System for High-Speed Precise Laser Trimming and Electrical Device Produced Thereby." That application claims priority to and is a continuation-in-part application of U.S. patent application Ser. No. 11/245,282, filed Oct. 6, 2005. That application claims the benefit of U.S. provisional application Ser. No. 60/617,130, filed Oct. 8, 2004, entitled "Laser System And Method For Laser Trimming." This application also claims priority to and is a continuation-in-part application of U.S. patent application Ser. No. 11/131,668, entitled "Method And System For High-Speed Precise Micromachining An Array Of Devices," filed May 18, 2005, which is a divisional of Ser. No. 10/397,541, entitled "Method And System For High-Speed Precise Micromachining An Array Of Devices," filed Mar. 26, 2003, which is a continuation-in-part application of U.S. patent application Ser. No. 10/108,101, entitled "Methods And Systems For Processing A Device, Methods And Systems For Modeling Same And The Device," filed 27 Mar. 2002, now published U.S. patent application No. 2002/0162973. U.S. Pat. No. 6,341,029, entitled "Method and Apparatus for Shaping a Laser-Beam Intensity Profile by Dithering," assigned to the assignee of the present invention with a common inventor, is hereby incorporated by reference in its entirety. This application is also related to U.S. Pat. No. 6,339,604, entitled "Pulse Control In Laser Systems," also assigned to the assignee of the present invention. This application is also related to U.S. Pat. No. 6,777,645, entitled "High-Speed, Laser-Based Method and System for Processing Material of One or More Targets Within a Field" also assigned to the assignee of the present invention.

BACKGROUND OF THE INVENTION

1. Field of the Invention

This invention generally relates to laser material processing and, more particularly, relates to methods and systems for high-speed, precise trimming utilizing a laser and scan lens for use therein.

2. Background Art

Laser trimming has been a part of manufacturing process in semiconductor and microelectronics industries for more than 30 years. One of the challenges is always to reduce the resistance drift after the trimming process. Post-trim stability is extremely important since the purpose of trimming in the first place is to increase device accuracy. If the device later drifts out of specifications, nothing has been gained. It has been known that trim induced instability or long-term drift arises from the heat-affected zone (HAZ) along the laser cut edges and any residual material in the cut itself. The laser trim itself causes heating and melting of film material near the trim. This heating causes a change in the sheet resistance, the temperature coefficient of the resistance (TCR), and the aging characteristics in the zone adjacent to the trim. Resistor material that has been heated to a very high temperature, but not vaporized, will have its electrical characteristics altered somewhat. The electrical resistance of these regions tends to increase over time before becoming stabilized.

The magnitude of the change is primarily dependent on the resistor material as well as the laser processing parameters. With the current laser technology, this potential instability due to the heat-affected zone along the laser cut edges remains. This is inherent in the trim process and it cannot be eliminated. The use of link cut geometry may be one solution since once the link is severed, little or no current flows in the unstable region. But links with reasonable resolution require a disproportionate share of the device real estate and are only used for simple trims such as op-amp offset voltage or in conjunction with a continuous trim in a course/fine arrangement. Simply designing larger resistors is another way to reduce the instability since this allows the current to spread over a larger area and the unstable portion becomes a smaller percentage of the total. However, this will squander precious real estate since cutting drift in half requires doubling the resistor size. Similarly, making the laser spot smaller reduces the size of the unstable region relative to the overall current carrying area resulting in an improvement in overall stability. This is limited, however, by the choice of the laser wavelength, of optics, and by various practicalities such as reduced depth of focus, less working distance, and material re-deposition in the case of thick films.

Traditionally, a Nd:YAG laser with wavelength at 1 micron is used for trimming of chip resistors. As the sizes of resistors get smaller, the substrates thinner, and tolerances tighter, this wavelength hits its fundamental limitations in terms of trimming kerf width, heat-affected zone (i.e., HAZ) and, therefore the drift of TCR and Resistance, R.

It is well known that shorter wavelengths can provide smaller optical spot size. It is also well known that the absorption of the film materials at shorter wavelength is higher. Therefore, the use of lasers with wavelengths shorter than the traditional 1 micron have the advantages of smaller kerf width that allows smaller features to be trimmed, and of smaller HAZ that leads to much less TCR drift and R drift.

As disclosed in the following U.S. Pat. Nos. 5,087,987; 5,111,325; 5,404,247; 5,633,736; 5,835,280; 5,838,355; 5,969,877; 6,031,561; 6,294,778; and 6,462,306, those skilled in the art of lens design will appreciate the complexities of scan lenses designed for multiple wavelengths.

Many design parameters are considered and various design trade-offs such as spot size, field size, scan angle, scan aperture, telecentricity, and working distance are used to achieve a laser scan lens design solution for trimming applications. In order to achieve a small spot over a large scan field, as preferred for high speed processing of fine structures over large areas, the scan lens must be able to focus a collimated input beam and image a diffraction limited laser spot over the entire field. The spot must be sufficiently round and uniform across the field to produce uniform trim cuts within the field. The lens must also provide adequate viewing resolution to image a selected target area for calibration and process monitoring. For through-the-lens viewing, light is collected from the illuminated field, collimated by the scan lens, and imaged onto a detector using auxiliary on-axis optics. By utilizing a different wavelength region for target viewing and an achromatized scan lens, efficient beam combining and splitting is possible using conventional dichroic optical elements. Within the viewing channel, good lateral and axial color correction is required, however small amounts of lateral color between the viewing and laser channels can be accommodated in the scan system and small amounts of axial color between the viewing and laser channels can be accommodated with focus adjustments in the field or in auxiliary optics. With a two mirror scan head, for example a galvanometer scan head when pupil correcting optics are not used, the scan lens must accommodate the pupil shift resulting from the separation between the two scan mirrors.

Relative lens capability can be determined by dividing the field size by the imaged spot size to find the number of spots per field. Conventional achromatized scan lenses for laser trimming, for example, the objective used in the GSI Lumonics W670 trim system for thick film trimming with a laser wavelength of 1.064 microns, produces a 30 micron spot over a 100 mm square field and images the target with conventional white light sources and auxiliary camera optics to a monochrome CCD camera. The W670 system is capable of about 4667 laser spots over the field diagonal. Lenses in system used for thin film trimming have smaller field sizes and smaller spot sizes. For example, the scan lens used in the GSI Lumonics W678 trim system, also with white light viewing capability, has a 12 micron spot over a 50 mm field, or about 4167 spots. Yet another thin film scan lens with a laser wavelength of 1.047 microns is used in the GSI Lumonics M310 wafer trim system, has a 6.5 micron spot over a 1 cm sq telecentric field and is capable of about 2175 spots with IR LED illuminators with an emission band of about 860 nm to 900 nm for viewing.

To some extent, lenses or lens design forms intended for IR laser scanning, especially IR scan lenses with white light viewing, can be used or modified to other laser wavelengths, for example, with green lasers. Reducing the wavelength theoretically reduces the spot size proportionally. However, considering increased lens aberrations and manufacturing tolerances, this may not be achievable. For example, a green version of the W670 lens produce a spot of about 20 microns compared to 30 microns for the IR version, and the number of spots per field is increased from 4667 to about 7000.

Conversely, it has been found that lenses designed primarily to operate at a green laser wavelength with a viewing channel at a longer wavelength can be optimized to scan a second wavelength, for example 1.047 microns or 1.064 microns, producing a spot approximately scaled up by the wavelength.

The following exemplary U.S. patents are related to laser trimming methods and systems: U.S. Pat. Nos. 6,534,743; 6,510,605; 6,322,711; 6,281,471; 5,796,392; 4,901,052; 4,853,671; 4,647,899; 4,511,607; and 4,429,298.

U.S. Pat. No. 4,429,298 relates to many aspects of serpentine trimming. Basically, a serpentine resistor is formed with sequential plunge cuts and a final trim cut is made parallel to the resistor edge from the last plunge. It describes "progressively" making plunge cuts on a resistor alternately from one end, considers maximum and minimum plunge cut lengths, a resistance threshold of the plunge cuts for the trim cut, a faster cutting speed for plunge cuts, and a structured process flow with various resistance and cut length tests.

There is a continuing need for improved high-speed, micromachining such as precise trimming at all scales of operation, ranging from thick film circuits to wafer trimming.

SUMMARY OF THE INVENTION

An object of the present invention is to provide an improved method and system for high-speed, precise trimming utilizing a laser and scan lens for use therein wherein post trim stability is improved.

In carrying out the above object and other objects of the present invention, a method is provided for high-speed, laser-based, precise laser trimming at least one electrical element. Each electrical element has at least one measurable property and is supported on a substrate. The method includes generating a pulsed laser output with a laser, the output has one or more laser pulses at a repetition rate. Each laser pulse has a pulse energy, a laser wavelength within a range of laser wavelengths, and a pulse duration. The method further includes selectively irradiating the at least one electrical element with the one or more laser pulses focused into at least one spot having a non-uniform intensity profile along a direction and a spot diameter less than about 15 microns so as to cause the one or more laser pulses having the wavelength, energy, pulse duration and the spot diameter to selectively remove material from the at least one element along a trim path and laser trim the at least one element while avoiding substantial microcracking within the at least one element. The wavelength is short enough to produce desired short-wavelength benefits of small spot size, tight tolerance, high absorption and reduced or eliminated heat-affected zone (HAZ) along the trim path, but not so short so as to cause microcracking.

The focused pulsed laser output power may correspond to about 10-50 mw with a spot diameter of less than about 15 µm. The power is scalable with reduced spot sizes less than about 15 µm such that corresponding power density is high enough to trim the element but sufficiently low to avoid microcracking.

Any microcracking obtained as a result of removing material from at least a first portion of the at least one element may be insubstantial compared to microcracking obtained upon removing material from the at least one element, or from a portion of a second element, using at least one other wavelength outside the range of laser wavelengths.

The removal of material from the at least one element may create a trim cut with a kerf width corresponding to the spot diameter.

The step of selectively irradiating with the one or more laser pulses may be carried out to at least limit formation of a heat-affected zone.

The repetition rate may be at least 10 Kilohertz.

At least one laser pulse of the laser output may have a picosecond or femtosecond pulse width.

An array of thin film electrical elements may be trimmed, and the method may further include selectively micromachining one element in the array to vary a value of a measurable property. The step of selectively micromachining is suspended, and while suspended, at least one other element in the array is selectively micromachined to vary a value of a measurable property. The method may further include resuming the suspended step of selectively micromachining to vary a measurable property of the one element until its value is within a desired range.

The at least one element may include a resistor, and the at least one measurable property may be at least one of resistance and temperature.

The method may further include suspending micromachining when a measurement of the at least one measurable property is within a predetermined range.

Still further in carrying out the above object and other objects of the present invention, a system is provided for high-speed, laser-based, precise laser trimming at least one electrical element. Each electrical element has at least one measurable property and is supported on a substrate. The system includes a laser subsystem to generate a pulsed laser output having one or more laser pulses at a repetition rate. Each laser pulse has a pulse energy, a visible laser wavelength, and a pulse duration. A beam delivery subsystem accepts the pulsed laser output and includes at least one beam deflector to position the one or more laser pulses relative to the at least one element to be trimmed, and an optical subsystem to focus the one or more laser pulses having the visible laser wavelength into at least one spot within a field of the optical subsystem. The at least one spot has a non-uniform intensity profile along a direction and a spot diameter less than about 15 microns. A controller is coupled to the beam delivery and laser subsystems to control the beam delivery and laser subsystems to selectively irradiate the at least one element such that the one or more laser output pulses having the visible laser wavelength, the pulse duration, the pulse energy and the spot diameter selectively remove material from the at least one element and laser trim the at least one element along a trim path while avoiding substantial microcracking within the at least one element. The laser wavelength is short enough to produce desired short-wavelength benefits of small spot size, tight tolerance, high absorption and reduced or eliminated heat-affected zone (HAZ) along the trim path, but not so short so as to cause microcracking.

The focused pulsed laser output power may correspond to about 10-50 mw with a spot diameter of less than about 15 μm. The power is scalable with reduced spot sizes such that corresponding power density is high enough to trim the element but sufficiently low to avoid microcracking.

The laser subsystem may include a q-switched, frequency-doubled, solid state laser having a fundamental wavelength in the range of about 1.047 microns to 1.32 microns, and the visible output wavelength may be a frequency-doubled wavelength in a visible wavelength range of about 0.5 microns to about 0.7 microns.

The spot diameter may be about 6 microns to about 10 microns.

The optical subsystem may include a lens that is achromatized at two or more wavelengths. At least one of the wavelengths may be a visible wavelength.

The system may further include an illuminator to illuminate a substrate region with radiant energy at one or more illumination wavelengths. A detection device may have sensitivity to the radiant energy at one of the illumination wavelengths wherein one of the two or more wavelengths may be a visible laser wavelength and the other may be the illumination wavelength.

The optical subsystem may be a telecentric optical subsystem.

The telecentric optical subsystem may include a telecentric lens.

The repetition rate may be at least 10 Kilohertz.

At least one laser pulse of the laser output may have a picosecond or femtosecond pulse width.

The focused spot diameter may be about 6 microns to about 10 microns at any location within the field of the optical subsystem.

The system may further include a calibration algorithm to adjust coordinates of material to be irradiated within the at least one element and to thereby precisely control a dimension of a region of material removal.

The system may further include a machine vision subsystem including a vision algorithm to locate or measure at least one geometric feature of the at least one element.

The vision algorithm may include edge detection and the at least one geometric feature are edges of the at least one element. The edges are used to determine width of the at least one element and to define a dimension for material removal.

A material of the substrate may be a semiconductor, or may be a ceramic or glass.

The at least one electrical element may be trimmed with a tolerance of 0.1% or better.

The at least one element may include a thin-film or thick-film element.

In thin-film, the material of the at least one element may be NiChrome, SiChrome or Tantulum Nitride.

An array of thin-film electrical elements may be trimmed with the system. The controller may include means to selectively micromachine an array element to vary a value of a measurable property, and means to suspend the selective micromachining while the selective micromachining is suspended. The controller may further include means to selectively micromachine at least one other array element to vary a value of a measurable property, and means to resume the selective micromachining to vary a measurable property of the array element until its value is within a desired range.

The system may further include a user interface, and a software program coupled to the interface and the controller. The software program may be adapted to accept pre-trim target values for the at least one element and to limit an electrical output being applied to the at least one element based on the values.

The laser may be a fast rise/fall, pulse-shaped q-switched laser.

The laser may be a picosecond or femtosecond laser.

TCR drift after trimming may be less than about 5 ppm.

The method may further include the step of spatially shaping the one or more laser pulses to form one or more spatially-shaped laser pulses which are focused into the at least one spot. The step of spatially shaping may be performed with the optical subsystem and may include at least one dispersion-compensated optical element.

Yet, still further in carrying out the above object and other objects of the present invention, a method of high-speed, laser-based, precise laser trimming at least one electrical element having at least one measurable property is provided. The at least one element is supported on a substrate. The method includes generating a pulsed laser output with a laser. The output has one or more laser pulses at a repetition rate. Each laser pulse has a pulse energy, a laser wavelength within a range of laser wavelengths, and a pulse duration. The method further includes selectively irradiating the at least one electrical element with the one or more laser pulses focused into at least one spot having a non-uniform intensity profile along a direction and a spot diameter less than about 15 microns so as to cause the one or more laser pulses having the wavelength, energy, pulse duration and the spot diameter to selectively remove material from the at least one element and laser trim the at least one element along a trim path while avoiding substantial microcracking within the at least one element. The temporal characteristics of the one or more laser pulses produce desired benefits of small kerf size, tight tolerance, and reduced or eliminated heat-affected zone (HAZ) along the trim path.

A temporal characteristic of the one or more laser pulses may include a substantially square pulse shape, fast rise and fall times, and a pulse duration less than about 30 nsec.

The pulse duration may be in either the femtosecond or picosecond range.

The laser wavelength may be a visible or near IR wavelength.

Yet, still further in carrying out the above object and other objects of the present invention, a system of high-speed, laser-based, precise laser trimming at least one electrical element having at least one measurable property is provided. The at least one element is supported on a substrate. The system includes a subsystem including a laser for generating a pulsed laser output. The output has one or more laser pulses at a repetition rate. Each laser pulse has a pulse energy, a laser wavelength within a range of laser wavelengths, and a pulse duration. The system further includes a subsystem for selectively irradiating the at least one electrical element with the one or more laser pulses focused into at least one spot having a non-uniform intensity profile along a direction and a spot diameter less than about 15 microns so as to cause the one or more laser pulses having the wavelength, energy, pulse duration and the spot diameter to selectively remove material from the at least one element and laser trim the at least one element along a trim path while avoiding substantial microcracking within the at least one element. The temporal characteristics of the one or more laser pulses produce desired benefits of small kerf size, tight tolerance, and reduced or eliminated heat-affected zone (HAZ) along the trim path.

The laser may be a fiber laser.

The subsystem for generating the pulsed laser output may include a master-oscillator/power amplifier.

The laser may be a femtosecond or picosecond laser.

The wavelength may be a visible or near IR wavelength.

Yet, still further in carrying out the above object and other objects of the present invention, a multiple element achromatic scan lens is provided. The multiple element achromatic scan lens is configured to provide a scan field encompassing a scan area of about 25 mm×50 mm, a green wavelength laser spot size less than 20 microns to about 8 microns or less, wherein a scan field diameter measures up to about 7000 spots, and a viewing channel with a bandwidth of at least 40 nm to 100 nm or more, wherein each element is composed of a glass type having an index of refraction, $n_n$, and a dispersion, $v_n$. The scan lens includes, in succession from a side of incident light: a first bi-concave element (L1) and a first cemented doublet including plano-concave and bi-convex elements (L2, L3), a cemented surface of the first cemented doublet being concave away from the incident light, wherein $n_2 < n_3$, $v_2 > v_3$, and $v_2$ represents an anomalous dispersion. The scan lens further includes a second cemented doublet including plano-concave and bi-convex elements (L4, L5), a cemented surface of the second cemented doublet being concave away from the incident light, a first negative meniscus element (L6) being concave toward the incident light (L6), and a first bi-convex element (L7). Values of $n_n$ and $v_n$ for each glass element are characterized by the relationships:

|    | Index                | Dispersion   |
|----|----------------------|--------------|
| L1 | $n_1 > 1.58$         | $v_1 < 40$   |
| L2 | $1.85 > n_2 > 1.5$   | $v_2 < 50$   |
| L3 | $n_3 > 1.58$         | $v_3 < 40$   |
| L4 | $n_4 > 1.61$         | $v_4 < 35$   |
| L5 | $1.85 > n_5 > 1.5$   | $v_5 > 40$   |
| L6 | $n_6 > 1.61$         | $v_6 < 35$   |
| L7 | $1.85 > n_7 > 1.5$   | $v_7 > 40$   |

Airspace between the second cemented doublet (L4/L5) and the first negative meniscus element (L6) may be set to zero thickness and elements L4, L5, and L6 may form a triplet (L4/L5/L6).

The second cemented doublet (L4/L5) may be replaced with a single element (L4).

Values of $n_n$ and $v_n$ for each glass element may be:

|    | Index | Dispersion      |
|----|-------|-----------------|
| L1 | 1.65  | 33.8            |
| L2 | 1.61  | 44.3 anomalous  |
| L3 | 1.81  | 25.4            |
| L4 | 1.81  | 25.4            |
| L5 | 1.69  | 53.3            |
| L6 | 1.81  | 25.4            |
| L7 | 1.62  | 56.9            |

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1c is a chart which illustrates the effect of various cut types on several trim parameters;

FIG. 2b is a block diagram flow chart further defining trimming steps corresponding to FIG. 2a;

FIG. 4b is a block diagram flow chart further defining trimming steps corresponding to FIG. 4a;

FIG. 6a is a schematic view of a laser trimming system which may be used in at least one embodiment of the invention;

FIG. 6b is a schematic view of a resistor which has geometric properties to be measured, specifically edges of the resistor, using data obtained with the system of FIG. 6a;

FIG. 7 is a graph which shows position of a laser beam versus time during scanning of a resistor array in one embodiment wherein a fast scan with a solid state deflector is superimposed with a electro-mechanical linear scan to selectively form the cuts of either FIG. 2 or FIG. 4 at increased speed;

FIG. 8 is a schematic view of a system delivering multiple focused beams to at least one resistor so as to increase trimming speed;

DETAILED DESCRIPTION OF THE PREFERRED EMBODIMENT(S)

High-Speed Serpentine Trimming Process

Figure 1A:
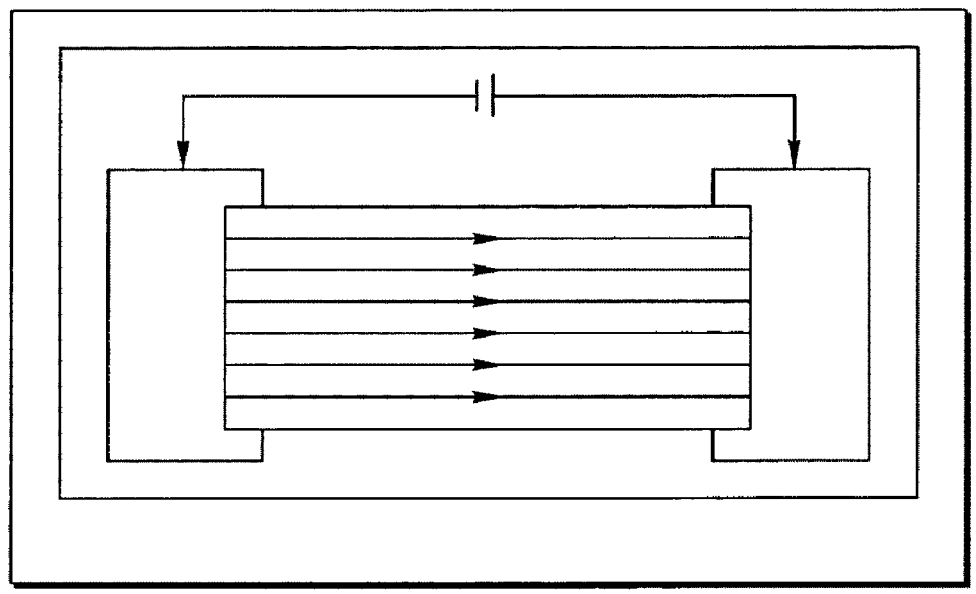
FIGS. 1a-1b are schematic views which illustrate current flow lines before and after laser trimming, respectively.
Figure 1B:
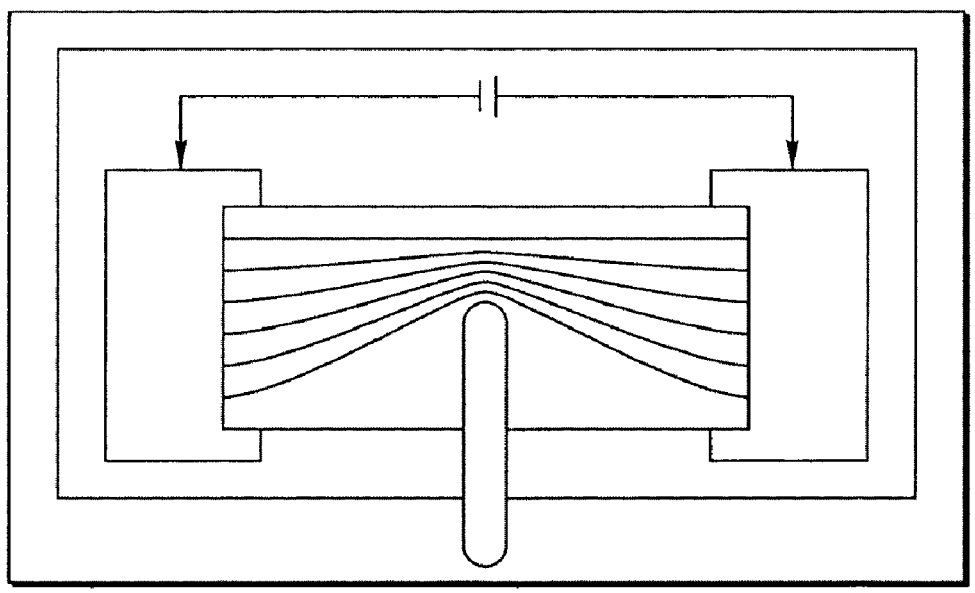

In resistor trimming, the cuts direct the current flowing through the resistive material along a resistance path. Fine control and adjustment of the cut size and shape change the resistance to a desired value, as illustrated in FIGS. 1a-1c. Typically, chip resistors are arranged in rows and columns on a substrate.

Figure 2A:
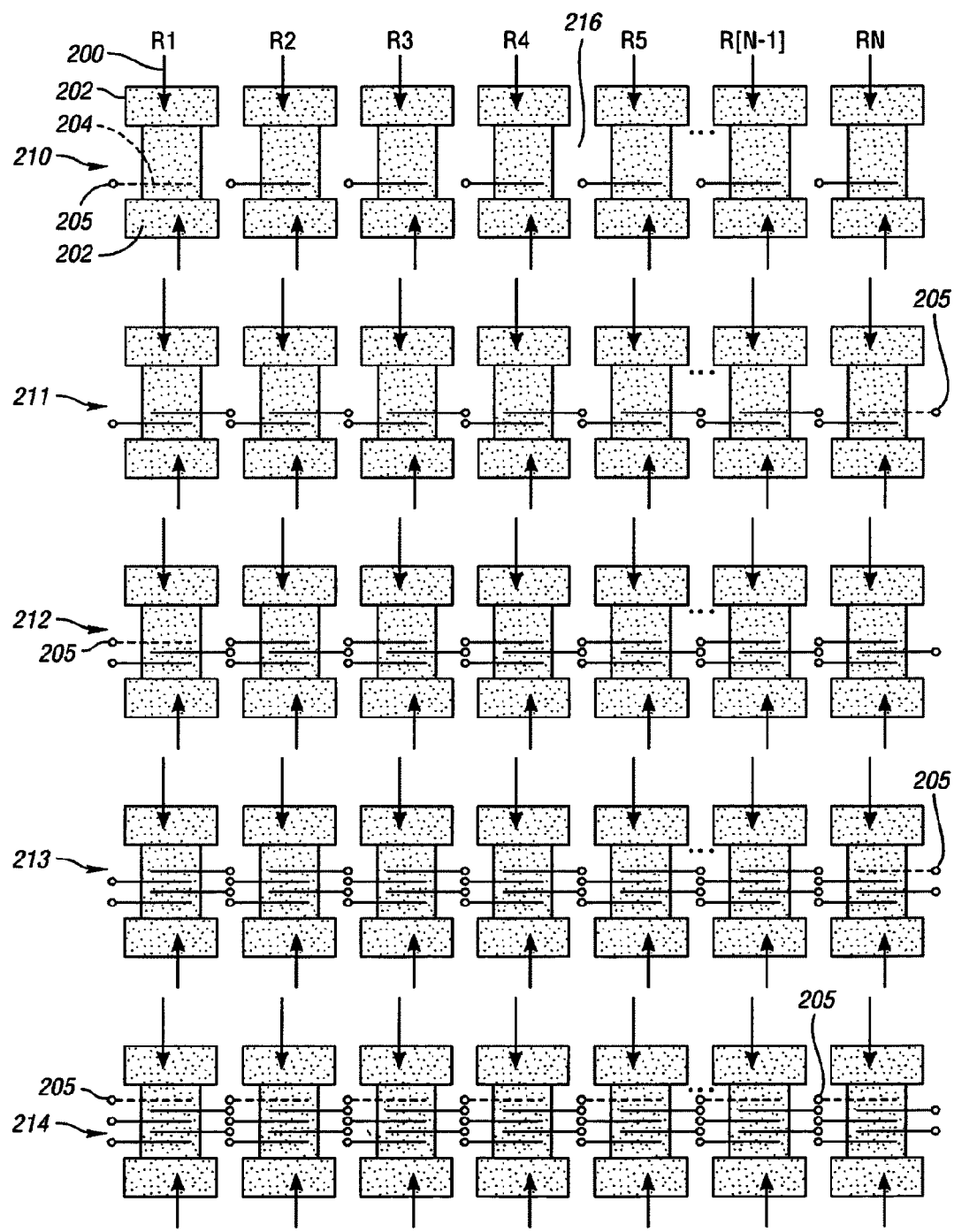
FIG. 2a is a schematic view of an array of chip resistors arranged in rows and columns and which illustrates results using laser trimming steps in accordance with an embodiment of the present invention.

FIG. 2a shows an arrangement wherein a row of resistors R1, R2, . . . RN is to be processed. A probe array, having a probe 200 and depicted by arrows in FIG. 2a, is brought into contact 202 with the conductors of a row of resistors. A matrix switch addresses the contacts for a first pair of conductors (e.g.: contacts across R1) and a series of cuts and measurements is performed to change the resistance between the conductor pair to a desired value. When the trimming of a resistor is complete, the matrix switches to a second set of contacts at the next row element (e.g.: R2) and the trimming process is repeated. When a complete row of resistors (R1 . . . RN) has been trimmed, contact is broken between the contacts and the probe array. The substrate is then relatively positioned to another row, the probe array is brought into contact, and a second row is processed in the manner as the preceding row.

The trimming of serpentine thin film resistors, for instance as illustrated in FIG. 1c, involves laser processing to create interdigitated cuts in an area of resistive material between conductors. The interdigitated cuts direct current flowing through the resistive material along a serpentine path that wraps around the cuts. This geometry allows a wide range of resistances to be created with a single areal film/conductor layout. The approach outlined above would process a sequence of serpentine cuts with measurement steps at a resistor site and then move to the next resistor.

Referring to FIG. 2a, an initial laser position for any cut is depicted as 205, and a beam positioner directs the beam along the linear path through the resistor material. In accordance with the present invention, a new paradigm trims a leg on a first resistor (e.g. trim cut 204 of R1) and measures the resistance. If the resistance is below a predetermined threshold, similar collinear trims across other resistors R2 . . . RN in the row are made. A completed collinear trim along the row is illustrated at 210 in FIG. 2a, and the corresponding block 220 is further defined in FIG. 2b. In at least one embodiment of the present invention, a subset of resistors may be measured to determine thin film consistency across the substrate, but if the thin film is of known consistency one measurement may be sufficient.

The next collinear group of cuts along resistors of the row is made in the same manner as shown at 211 of FIG. 2a and further defined at block 221 of FIG. 2b, the resistor RN being trimmed initially. The process is repeated as shown in 212-213 of FIG. 2a with corresponding further defined at blocks 222-223 of FIG. 2b. If a measurement shows that a threshold has been crossed, trimming of the row R1 . . . RN proceeds with measurement of each resistor so as to trim to value before switching to the next resistor (depicted as 214 at block 224).

Limiting the number of measurements and maintaining a collinear trim trajectory both increase trim speed.

Figure 3:
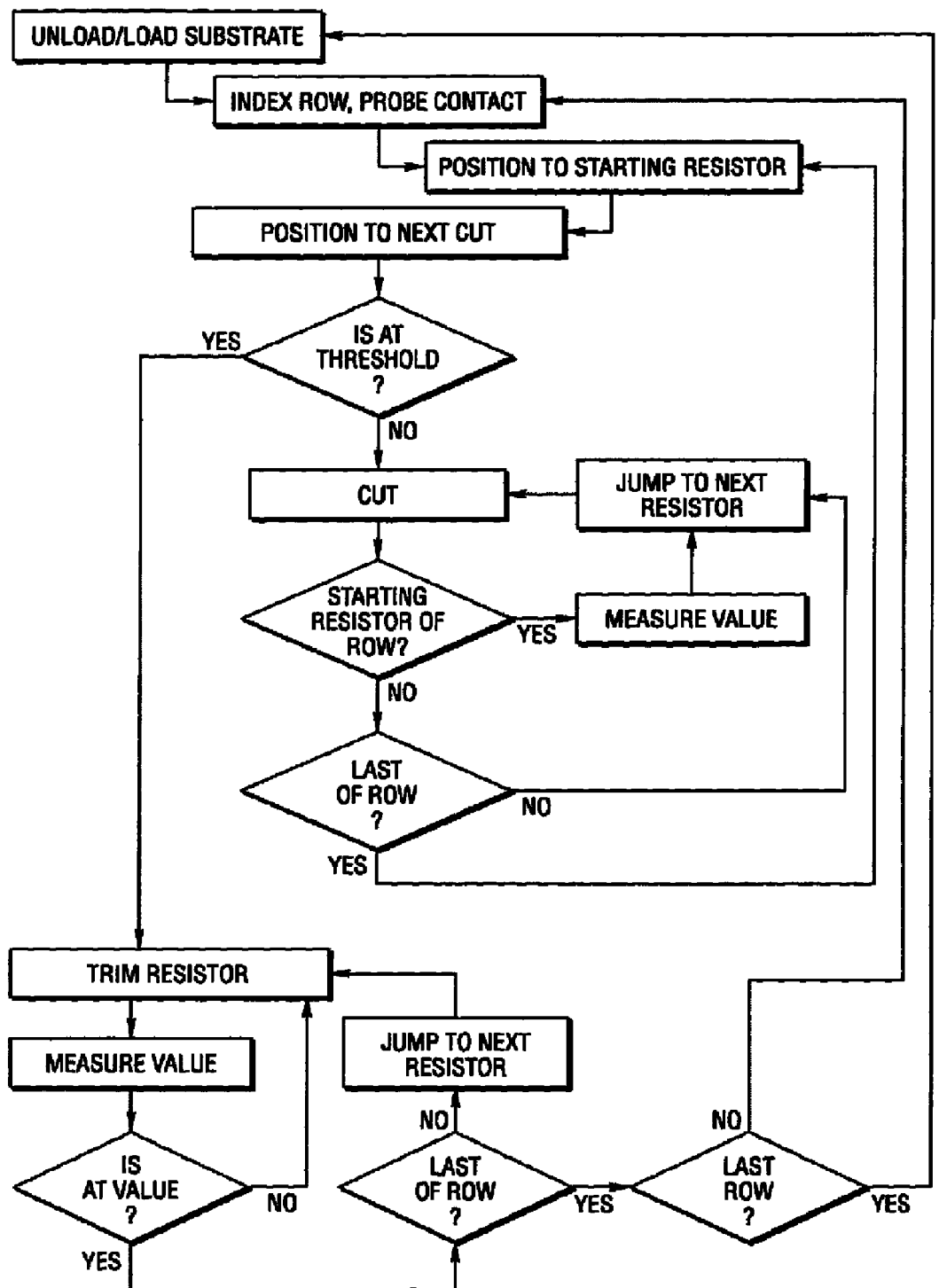
FIG. 3 is a block diagram flow chart further defining the trimming operations of FIGS. 2a and 2b in a system of the present invention.

The flowchart of FIG. 3 further defines steps, corresponding to FIGS. 2a-2b, and additional processing steps used in a trimming system (e.g.: indexing and loading).

In at least one embodiment, cutting steps may be carried out based upon pre-determined information. By way of example, for some resistor types, a first series of elements may be cut before resistance is measured, the sequence based on pre-determined parameters of the resistor (e.g.: geometry) and/or known film properties, (e.g: sheet resistance). Similarly, a number of non-measured cuts may be determined in a learn mode at the first resistor (e.g: including at least one measurement, or iterative measurements). In one learn mode, iterative measurements are made and the number of non-trim cuts is determined based on the measurements and material properties. In at least one embodiment a number of the non-measured cuts may be calculated.

Figure 4A:
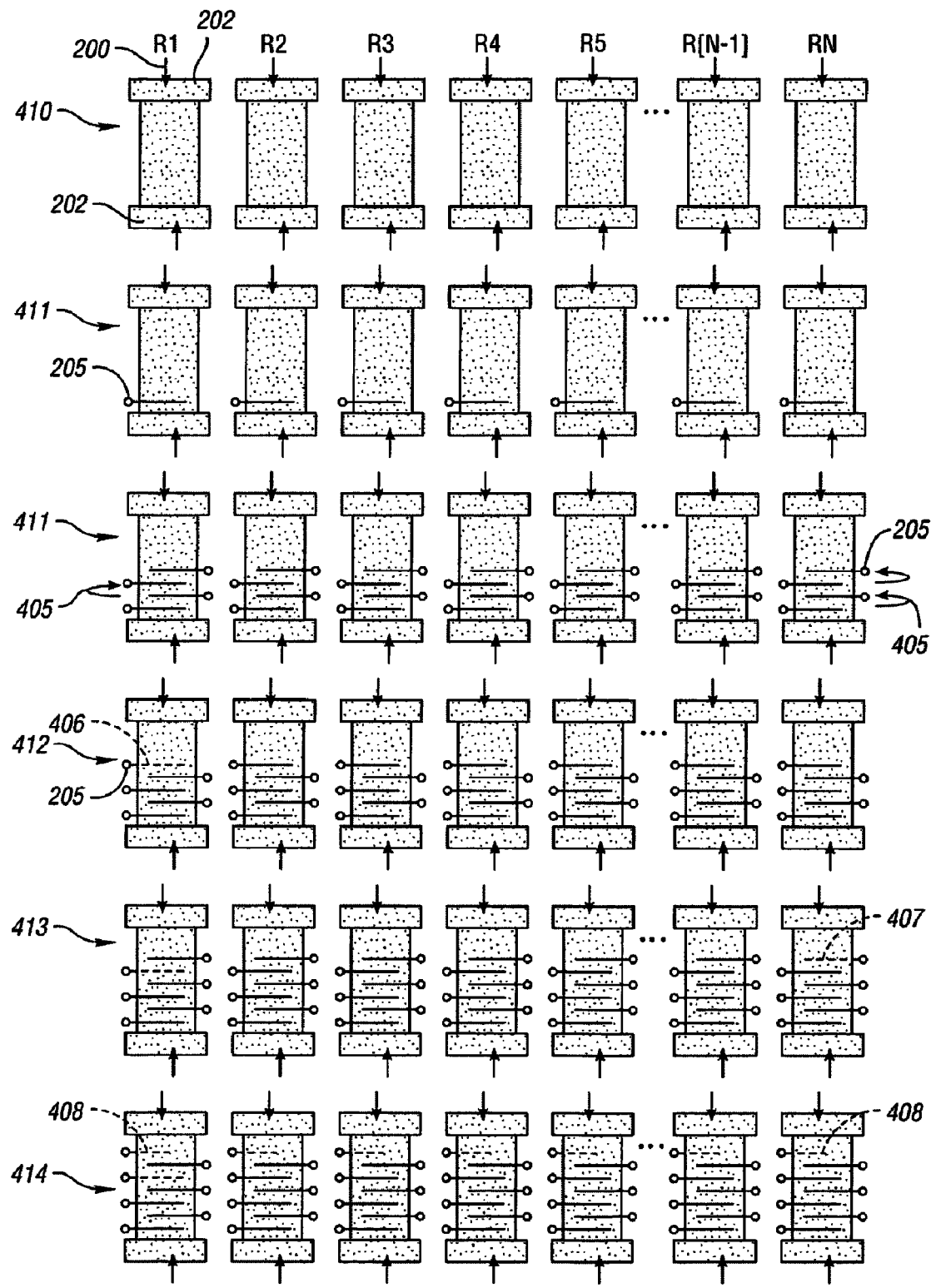
FIG. 4a is a schematic view of an array of chip resistors arranged in rows and columns and which illustrates results using laser trimming steps in accordance with another embodiment of the present invention.

For example, four cuts may be made without measurement. Referring to FIG. 4a, an initial condition 410 is illustrated wherein probes are placed in contact 202 with the row as in FIG. 2a. Referring to FIG. 4b, the initial condition is further defined at block 420. By way of example, FIGS. 4a-4b illustrate an embodiment of the trimming process wherein initially four cuts 411 are made without any measurement. As shown in FIG. 4b, block 421 defines a predetermined number of cuts (e.g: four), without measurement, based on at least one pre-trim value or condition. The scan path for completing four cuts is depicted at 405. Then the first resistor R1 in the row is trimmed at 406 and measured to determine if the target value is reached. If not, the remaining resistors R2 . . . RN are cut (e.g.: without measurement) as depicted at 412, further defined by block 422.

Then the process is repeated, beginning with trimming 407 of RN, and then cutting of R[N−1] to R1 as shown at 413 and further defined by block 423. Hence, with each change in direction either R1 or RN is trimmed, and if the target value is not reached the remaining resistors R2 . . . RN or R[N−1] . . . R1, respectively, are cut. A final step results after R1 or RN reaches a target value. Each resistor is connected and trimmed sequentially, illustrated at 414 and further defined by block 424.

Figure 5:
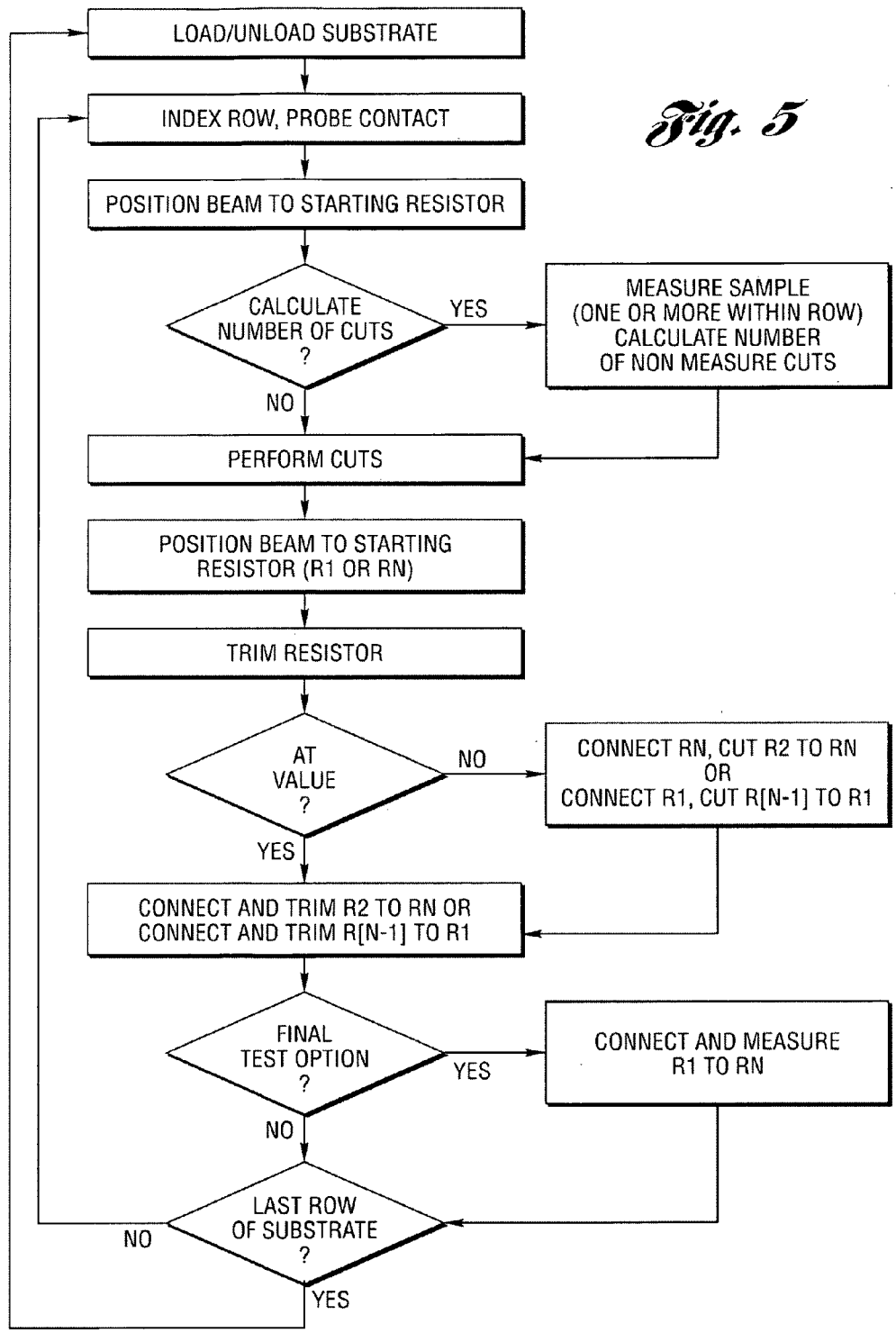
FIG. 5 is a block diagram flow chart further defining the trimming operations of FIGS. 4a and 4b in a system of the present invention.

The flowchart of FIG. 5 further defines steps corresponding to FIGS. 4a-4b, and additional processing steps used in a trimming system (e.g.: which includes the steps of indexing and loading).

In one embodiment, wherein pre-determined information is obtained using iterative measurements, pre-trim values are provided. The values may be specified by an operator, process engineer, or otherwise obtained. The software provides capability for specifying or using the pre-trim target values so that the applied test voltage and/or current is controlled. This feature is useful for avoiding voltages that are high enough to damage the part over the wide range of resistance change associated with serpentine trimming. When using a fast resistor measurement system in an embodiment of the invention, the voltage applied to the resistor for measurement is decreased for the initial low resistance cut to limit current through and potential damage to the resistor. As subsequent cuts are made and the resistance increases, the measurement voltage is increased.

The exemplary trim and cut sequences of FIGS. 2a and 2b and 4a and 4b may be modified so as to allow for variations in material properties and other process parameters and tolerances.

For example, in at least one embodiment of the present invention, additional steps may be utilized when a measured trim cut reaches the target value and length is within a predetermined margin of the maximum allowed cut length. Within the margin, variation in the material properties may leave some trim cuts short of the target value and require additional cuts.

In a first mode, trim cuts are made sequentially in a row of elements and the location of elements not reaching the target value are saved. With subsequent trim cuts, the remaining elements at the saved locations are trimmed to the target value.

In a second mode, based on the length of the first element trimmed to value, the cut length is reduced to prevent the target value from being reached and non-measurement cuts are processed to complete the row. Subsequent trim cuts bring all elements in the row to the target value.

In a third mode, the length of at least one prior cut on an element is modified to prevent subsequent cuts from falling into the marginal condition. In at least one embodiment, additional steps may be utilized when the value of a measured trim cut is within a predetermined margin of the target value. Within the margin, variation in the material properties may leave some elements beyond the target value using full non-measurement cuts.

In a first mode, trim cuts are made sequentially in a row of elements and the location of elements not reaching the target value are saved. With subsequent trim cuts, the remaining elements at the saved locations are trimmed to the target value.

In a second mode, based on the value measured in the first element, the cut length is reduced to prevent the target value from being reached and non-measurement cuts are processed to complete the row. Subsequent trim cuts bring all elements in the row to the target value.

In a third mode, the length of at least one prior cut on an element is modified to prevent subsequent cuts from falling into the marginal condition.

Experimental data indicates improvements in throughput by cutting all the resistors in a row as shown in FIGS. 2-4, as opposed to the conventional single resistor trim technique. By way of example, approximate results are shown in the table below:

| 32 RESISTOR ROW, 20 CUTS PER RESISTOR | | |
| --- | --- | --- |
| Laser Q-Rate (KHz) | Single Resistor Trim (Sec) | Row Trim (Sec) |
| 5 | 39 | 28 |
| 10 | 27 | 16 |
| 20 | 20 | 10 |

The overall trim speed increases with an increasing number of resistors in a row, fewer measurements, and with reduced time for final (i.e., fine) trimming.

Further, each resistor has additional time to recover from laser generated energy. The sequence of cuts may be determined to manage temperature change in an element (e.g. reduce maximum element temperature during cutting). For example, with reference to FIG. 4a, the sequence 405 may be reversed so that a set of cuts are made starting near the center of an element and progressing to an end of the element approaching the conductor and probe. Other sequences, suitable sequences may be used (e.g: any sequence of non-adjacent cuts having advantage for thermal management). Preferably, a second element may be cut prior to an additional step of measuring.

Range of resistance change for serpentine cuts varies from about 1 order of magnitude (e.g: 10×), two orders of magnitude typical (100×), and up to about 500× with current materials.

Laser Trimming Systems

In at least one embodiment of the invention a laser trimming system may be first calibrated using a method as described in "Calibrating Laser Trimming Apparatus", U.S. Pat. No. 4,918,284. The '284 patent teaches calibrating a laser trimming apparatus by controlling a laser beam positioning mechanism to move a laser beam to a desired nominal laser position on a substrate region, imprinting a mark (e.g., cutting a line) on a medium to establish an actual laser position, scanning the imprinted mark to detect an actual laser position, and comparing the actual laser position with the desired nominal position. Preferably, the laser beam operates on one wavelength, and the mark is scanned with a detection device that operates on a different wavelength. The detection device views a field that covers a portion of the overall substrate region, and determines the position of a mark within the field. The '284 patent further teaches determining where a beam position is in relation to a camera field of view.

Other calibration techniques may be used alone or in combination with the '284 method. For instance, U.S. Pat. No. 6,501,061 "Laser Calibration Apparatus and Method," discloses a method of determining scanner coordinates to accurately position a focused laser beam. The focused laser beam is scanned over a region of interest (e.g. an aperture) on a work-surface by a laser scanner. The position of the focused laser beam is detected by a photodetector either at predetermined intervals of time or space or as the focused laser beam appears through an aperture in the work surface. The detected position of the focused laser beam is used to generate scanner position versus beam position data based on the position of the laser scanner at the time the focused laser beam is detected. The scanner position versus beam position data can be used to determine the center of the aperture or the scanner position coordinates that correspond with a desired position of the focused laser beam.

Subsequent to system calibration, which preferably includes calibration of numerous other system components, at least one substrate having devices to be trimmed is loaded into the trimming station.

Referring to FIG. 6a, partially incorporated from the '284 patent, an improved laser trimming system may include an infrared laser 602, typically having a wavelength from about 1.047 microns-1.32 microns which outputs a laser beam 603 along an optical path 604 to and through a laser beam positioning mechanism 605 to a substrate region 606. For application to trimming of thin film arrays, a preferred wavelength of about 0.532 microns may be obtained by doubling the output frequency of the IR laser using various techniques known in the art and commercially available.

The laser beam positioning mechanism 605, preferably includes a pair of mirrors and attached respective galvanometers 607 and 608 (various available from the assignee of the present invention). The beam positioning mechanism 605 directs the laser beam 603 through a lens 609 (which may be telecentric or non-telecentric, and preferably achromatized at two wavelengths) to a substrate region 606, over a field. The X-Y galvanometer mirror system may provide angular coverage of the entire substrate if sufficient precision is maintained. Otherwise, various positioning mechanisms may be used to provide relative motion between the substrate and the laser beam. For instance, a two-axis precision step and repeat translator illustrated schematically as 617 may be used to position the substrate within the field of galvanometer based mirror system 607,608 (e.g.: in the X-Y plane). The laser beam positioning mechanism 605 moves the laser beam 603 along two perpendicular axes thereby providing two dimensional positioning of the laser beam 603, across the substrate region 606. Each mirror and associated galvanometer 607, 608 moves the beam along its respective x or y axis under control of a computer 610. Illumination devices 611 which may be halogen lights or light emitting diodes produce visible light to illuminate substrate region 606.

A beam splitter 612 (a partially reflective mirror) is located within the optical path 604 to direct light energy reflected back along the path 604 from the substrate region 606 to a detection device 614. The detection device 614 includes a camera 615, which may be a digital CCD camera (e.g.: color or black/white) and associated frame grabber 616 (or digital frame buffer provided with the camera), which digitizes the video input from the television camera 615 to obtain pixel data representing a two-dimensional image of a portion of the substrate region 606. The pixel data are stored in a memory of the frame grabber 616, or transmitted, for instance, by a high speed link, directly to the computer 610 for processing.

The beam positioning subsystem may include other optical components, such as a computer-controlled, optical subsystem for adjusting the laser spot size and/or automatic focusing of the laser spot at a location of the substrate.

In applying the invention to thin film trimming of resistor arrays, at least one thin film array is supported by the substrate. The calibration data obtained as above is preferably used in combination with an automated machine vision algorithm to locate an element (e.g. resistor R1) of the array and measure the location of at least one geometric feature of an element 620 of FIG. 6b. For instance, the feature may be one of the horizontal edges 621 (e.g.: an edge parallel to the X-direction), and one of the vertical edges 622 (e.g.: an edge parallel to the Y direction) found by analysis of pixel data in memory using one of numerous available edge detection algorithms. The edges may include multiple edge measurements along the entire perimeter of a resistor, a sample of the edges, or edges from numerous resistors of the array. The width of the resistor is then determined which may be used to define the cutting length, typically as a predetermined percentage of the width. Preferably, the edge information is obtained automatically and used with calibration data to control the length of each cut within the row R1 . . . RN, for example. Other measurement algorithms may also be used where suitable, for instance image correlation algorithms or blob detection methods.

Calibration may be applied at one or more points along the cut. In at least one embodiment the starting point of at least one cut will be corrected with calibration data.

Preferably, the length and the starting point of a plurality of cuts in FIGS. 2 and 4 will be corrected.

Most preferably, the length and starting point of all cuts in FIGS. 2a and 4a will be corrected.

In one embodiment, the first resistor (e.g.: R1 or RN) will be calibrated, and a corresponding-correction applied to all resistors (e.g.: R1, . . . , RN) of the row.

Complete automation is preferred. However, a semi-automatic algorithm with operator intervention may be used, for instance where a galvanometer is positioned so that the array element 620 is in the field, then the beam is sequentially positioned along the element interactively and the intensity profile (or derivative or intensity) observed on a display 630 by an operator.

The use of the calibration information to adjust coordinates within the array region is valuable for improving the precision of laser beam positioning without throughput degradation. Measurements of resistor width and the alignment data is useful for both controlling the length of a cut and for correcting deviations from linearity and non-orthogonality of the array relative to the scanner X,Y coordinate system. The use of the calibration data for geometric correction is particularly well suited for use in laser trimming systems having one or more linear translation stages.

Geometric correction does not necessarily replace other useful system design features including f-theta lens linearity, fan beam compensation etc. The system tolerance stack-up may generally be used to determine tradeoffs between the number of cut calibration locations based on expected position error. When fanning out the beam, especially with large spacing across many resistors, only one is calibrated and aligned. For instance, when the spacing between resistors is relatively large, a single cut may be calibrated and aligned. Resulting errors in position are anticipated at elements, to be mitigated in part with system design, f-theta linearity, fan spread compensation etc. Closely spaced cuts of a transverse fan are expected to have smaller errors compared with on axis fan.

Further Throughput Improvements—Optical Techniques

In at least one embodiment of the present invention the throughput may be further improved by increasing the effective scan rate using one or more of the techniques below.

Further increases in processing speed with collinear trims can be accomplished with faster jumps across trim gaps between the resistors of a row. One such gap 216 is shown in FIG. 2a. Referring to FIG. 7, in at least one embodiment of the invention, a single-axis Acousto-Optic Beam Deflector (AOBD) superimposes a saw tooth linear scan pattern 701 as the galvanometer scans across the row at a constant velocity 702. During trimming the AOBD scans in retrograde motion 703, and, between trims, provides a fast jump 704 to the next cut. This allows the galvanometer to scan at constant velocity and minimizes the contributions of jumps to the total process time.

The use of acousto-optic deflectors in combination with galvanometers for speed improvements is known in the art. For instance, U.S. Pat. No. 5,837,962 discloses an improved apparatus for heating, melting, vaporizing, or cutting a workpiece. A two-dimensional acousto-optic deflector provided about a factor of five improvement in marking speed.

U.S. Pat. No. 6,341,029, which is incorporated by reference in its entirety, shows in FIG. 5 thereof an embodiment having several components which may be used in a complete system when practicing the present invention in a retrograde mode for increased speed. In the '029 patent, acousto-optic deflectors and galvanometers, with an associated controller, are shown for dithering CW beams for laser patterning. Also see col. 3, line 47 and col. 4 of the '029 patent for additional details regarding system construction.

The arrangement of the '029 patent may be readily adapted, using available techniques, so as to provide modifications of optical components and scan control profiles so as to practice the retrograde scanning technique of the present invention, preferably with additional hardware calibration procedures.

In another embodiment of the invention, the collinear trims on serpentine resistors may be accomplished in a parallel fashion with multiple spots along the row. A fan-out grating or other multi-beam generating device is used to create a spot array so that 2 or more spots are formed and aligned according to the resistor pitch along the row. For example, U.S. Pat. No. 5,521,628 discloses the use of diffractive optics to simultaneously mark multiple parts. The multiple beams may be lower power beams generated from a more powerful laser source, or combined beams from multiple sources. The scan system scans the multiple beams and forms spots through a common scan lens simultaneously across multiple resistors. The trim process is similar to the single spot method with two or more cuts in parallel during non-measurement cutting steps. When the threshold is reached, the system converts to a single spot mode to serially trim each resistor to value.

Similarly, the collinear trims on serpentine resistors may be accomplished in a parallel fashion with multiple spots formed on a target to make parallel cuts. A fan-out grating or other multi-beam generating device is used to create a spot array so that 2 or more spots are formed, the spots being aligned to an element with predetermined spacing between cuts. If a predetermined number of cuts are performed (e.g. four as shown in FIG. 4a) then, in one embodiment, the number of passes could be reduced by 50% (e.g.: a single pass in each direction). This embodiment may be most useful if resistor process variations and tolerances are well established. The grating may be in an optically switched path so as to selectively form multiple spots or a single spot.

Published U.S. patent application No. 2002/0162973 describes a method and system for generating multiple spots for processing semiconductor links for memory repair. Various modifications in the lens system and deflector system may be used to generate multiple spots for use in the present invention.

In one embodiment, a single laser pulse is used to trim up to two resistors at one time (e.g., no, one or two cuts). Referring to FIG. 8, two focused spots 801,802 are formed on two cuts by spatially splitting the single collimated laser beam 803 into two diverging collimated beams 804,805. Fine adjustment of the differential frequency controls spot separation. The use of acousto-optic devices for spatially splitting beams in material processing applications is known in the art. For example, Japanese patent abstract JP 53152662 shows one arrangement for drilling microscopic holes using a multi-frequency deflector having selectable frequencies f1 ... fN.

A laser 806 of FIG. 8 is pulsed at a predetermined repetition rate. The laser beam goes through relay optics 807 that forms an intermediate image of the laser beam waist into the acoustic optic modulator (AOM) aperture. The AOM 808, which operates in the Bragg regime, preferably is used to controllably generate the two slightly diverging collimated first order diffraction laser beams and control the energy in each beam. The AOM is driven by two frequencies, f1 and f2 where f1=f0+df and f2=f0−df where df is a small percentage of the original RF signal frequency f0. The angle between the two beams is approximately equal to the Bragg angle for f0 multiplied by 2(df/f0). The AOM controls the energy in each of the laser beams by modulating the signal amplitudes of two frequency components, f1 and f2, in the RF signal 812 and making adjustments for beam cross-coupling.

After exiting the AOM 808, the beams go through an optional beam rotation control module 809 to rotate the beam 90 degrees so as to orient the beam in either X or Y. In one embodiment, a prism is used for this rotation, though many rotation techniques are well known as described in related U.S. patent publication No. 2002/0170898.

Next, the beam goes through a set of optics to position the beam waist and set the beam size to be appropriate for the zoom optics and objective lens 810. The zoom optics also modify the angle between the two beams, therefore the angle between the two beams exiting the AOM 808 has to be adjusted depending on the zoom setting to result in the desired spot separation at the focal plane. Next, the laser beams enter the objective lens 810 which provides a pair of focused spots 801,802 on two resistors. The two spots are separated by a distance that is approximately equal to the focal length of the lens 810 times the angle between the two beams. The retrograde and parallel methods can be combined for collinear trimming on serpentine resistors. For example, a beam is scanned by an AOBD then split into a pair and scanned across the field. Two adjacent resistors are trimmed simultaneously and the jump is from resistor N to resistor N+2 to the next pair or resistors.

Alternatively, or with a two-dimensional deflector, a pair of spots may be produced in a direction orthogonal to the serpentine scan direction. For instance, with relatively simple control and programming of a one-dimensional AOBD, the deflector may be used (with appropriate output power control) to simultaneously produce at least two of the four beams used for making four cuts as shown in FIG. 4a. As such, the scan time for the cuts may be reduced by 50%. As a result of programmable deflection, the AOBD may be preferred over a fan out grating. The multiple spots may also be produced during coarse and fine trim as needed.

Figure 9:
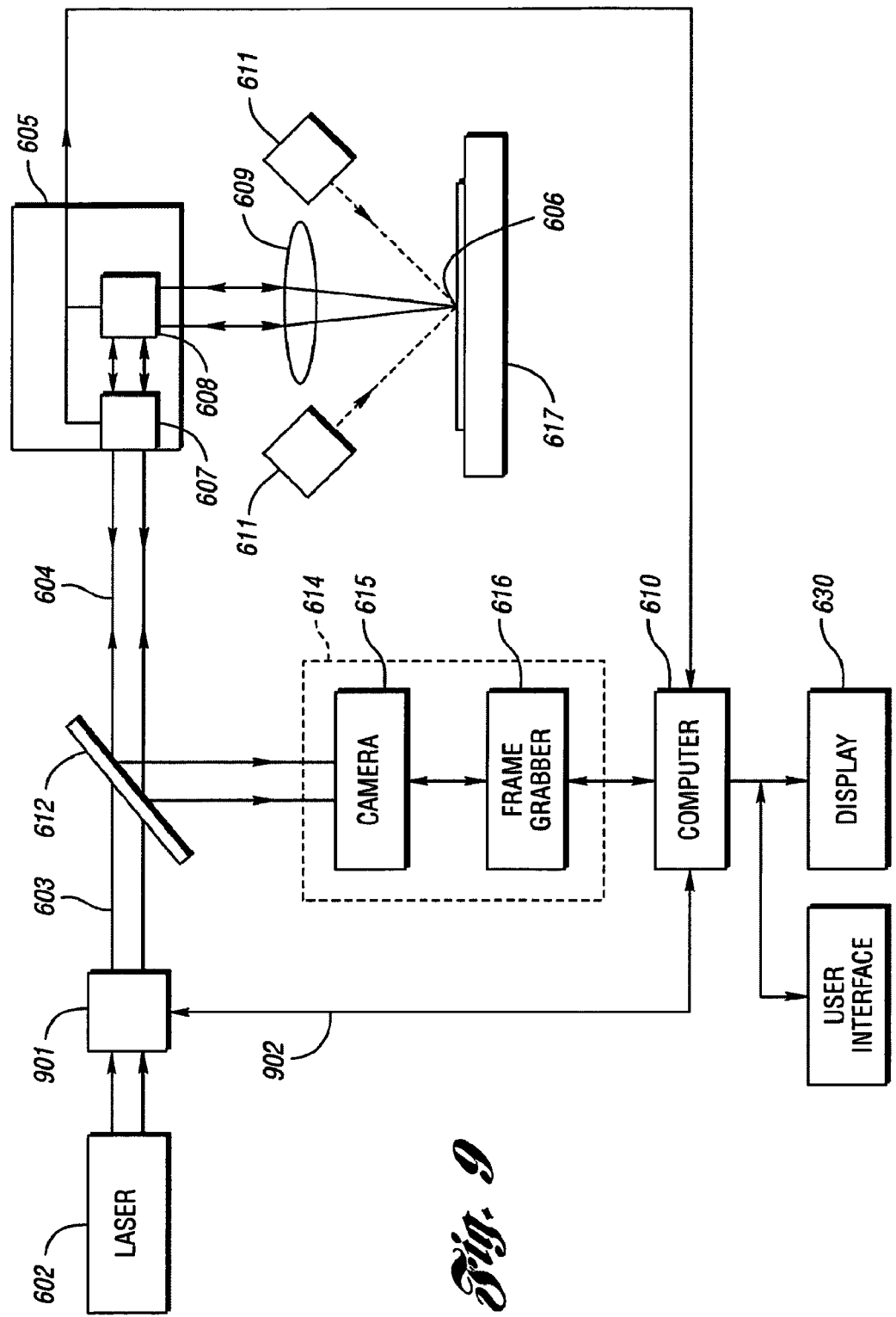
FIG. 9 is a schematic view of a system which provides multiple beams to at least one resistor in a laser trimming system.

FIG. 9 illustrates schematically an exemplary embodiment of an improved laser trimming system having a module 901 from FIG. 8 added for either retrograde scanning, parallel processing, or a combination thereof. For example, a signal 902 from the computer 610 may be used to control the AOBD or other solid state deflector 808 in one or more axes, and the beam rotation module 809, if provided. The module 901 may include relay optics 807 and other beam shaping components. Preferably, at least one AOBD is used so as to provide considerable flexibility and ease of use, for example with a digital RF generator providing the control signal 812 from the computer 610.

Furthermore, techniques for forming elongated or elliptical spots can be employed with this invention to further increase processing speed or quality. Improvements in trimming speed associated with spot shaping are described in co-pending published U.S. patent application No. 2002/0170898.

Numerous other design alternatives may be used in at least one embodiment of the invention for enhancing system performance and ease of use. For example, alternatives include but are not limited to the following:

1. The system may provide for computer-controlled spot size and/or focus adjustments. U.S. Pat. No. 6,483,071, assigned to the assignee of the present invention, illustrates an optical subsystem providing for both spot size control and dynamic focus for laser based memory repair.

2. Another alternative is control of beam energy with a variable beam attenuator. The attenuator may be an acousto-optic deflector (or modulator). Neutral density filters or polarization-based attenuators may be used, whether manually or automatically adjusted. In U.S. Pat. No. 6,518,540 a suitable variable attenuator is shown, by way of example, having a rotating half waveplate and a polarization-sensitive beam splitter.

3. The pulse width may be varied using methods known to those skilled in the art, with the understanding that the energy of a q-switched laser will vary with repetition rates, particularly at high repetition rates. For dynamic trimming, wherein a measurement is performed between pulses, it may be preferred to maintain substantially constant pulse energy. A method for pulse energy control is disclosed in the U.S. Pat. No. 6,339,604 patent which reduces the variation in energy at the target as the trimming speed is decreased (e.g.: larger pulse temporal spacing), corresponding to periods of precision measurement when the resistance value approaches the pre-determined target value.

4. In at least one embodiment, a diode-pumped, frequency-doubled, YAG laser is used to trim the resistor array. The output wavelength of 532 nm resulted in low drift, absence of microcracking, and negligible heat-affected zone when compared to other wavelengths. A pulse width of about 25-45 ns may be preferred, with less than 30 ns typical. The preferred maximum laser repetition rate will be at least 10 KHz. The pulse width, much less than typical for thick film systems, provides for thin film material removal at a relatively high repetition rate. Preferably, the maximum available pulse energy at the reduced pulse widths and high repetition rates will allow for losses associated with the diffractive optics (e.g: grating or AOBD) so that multiple spots may be provided.

5. The laser may be focused to an approximate, diffraction-limited, spot size. The spot size will typically be less than about 30 microns or less, with a preferred spot size less than about 20 microns, and a most preferred spot size in the range of about 6-15 microns, for instance, 10-15 microns.

6. In the illustrated embodiments of the invention, serpentine cuts are illustrated as a series of parallel interdigitated cuts. However, it is to be understood that application of the present invention is not restricted to forming parallel cuts. Trimming or micromachining so as to produce a plurality of non-intersecting cuts with a reduced number of measurements is considered to be within the scope of the invention.

7. Further, embodiments of the invention are not restricted to thin film resistor measurements, but are applicable to other micromachining applications wherein a physical property is measurable. The measurement is not restricted to electrical measurements, but may be temperature monitoring (for instance, with an infrared sensor), stress, vibration, or other property.

Figure 10:
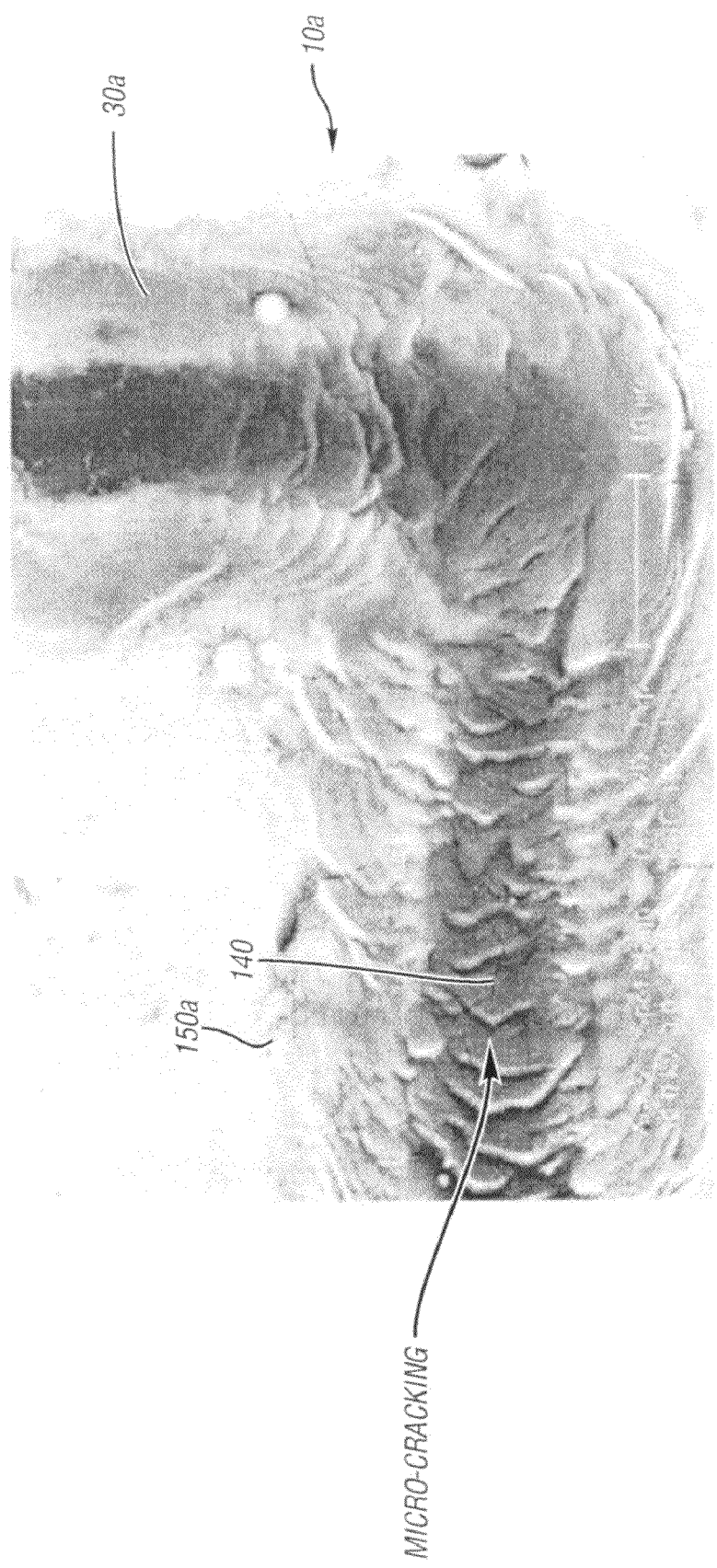
FIG. 10 is an electron micrograph (reproduced from FIG. 11 of U.S. Pat. No. 6,534,743) of kerf showing microcracks formed in the substrate of a resistor trimmed by a Gaussian beam produced by a UV laser.

As described herein, a comparative application study was conducted by using three types of lasers, i.e., a conventional IR laser 1.064 μm, a green laser 0.532 μm, and a UV laser 0.355 μm. The results of the study clearly showed that the green laser gives the same or better results than the UV laser in terms of TCR drift and resistance tolerance achieved. However, the samples processed by UV lasers are easy to have microcracking in the cut, like those indicated in FIG. 10.

By way of example, a pulsed laser output of about 30 mW was applied to the resistor material over a spot size of about 13 microns on the surface. The wavelength was 0.532 microns. Favorable results, particularly absence of microcracking, were found with the green wavelength. Laser operation may be carried out in a range of about 10 mw to about 50 mw over the 13 micron spot diameter.

The corresponding power density (in Watts/cm$^2$) is a function of the spot size, and the laser output power in a pulse may be scaled accordingly as the spot size is changed. For instance, the laser power (in mW) in a pulse may be reduced by 4-times if the spot size is 6 microns.

Though a wavelength of 0.532 microns was demonstrated with favorable results, other wavelengths may be utilized. However, embodiments of the present invention avoid wavelengths so short as to cause substantial microcracking.

Figure 12:
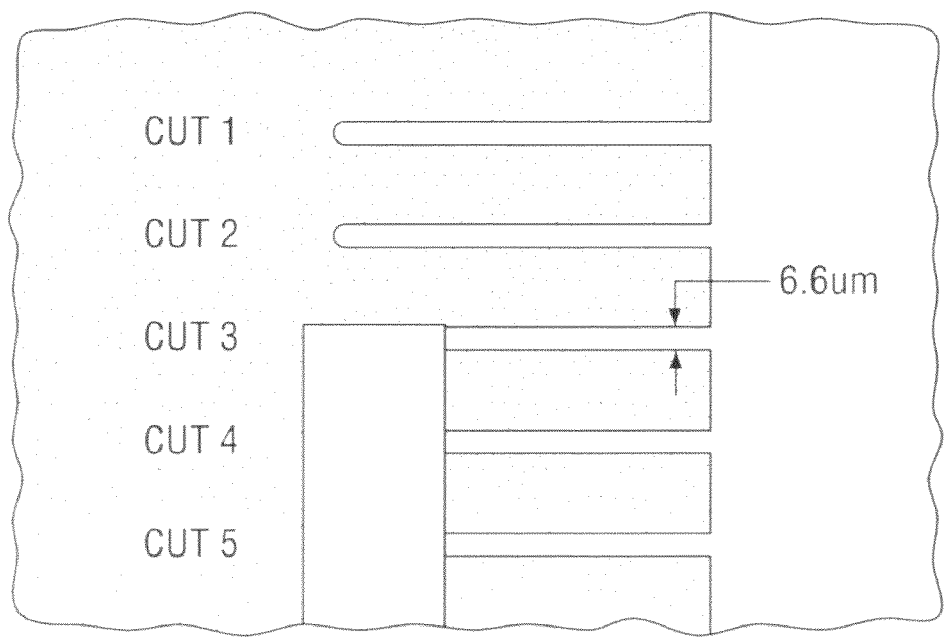
FIG. 12 is a view of kerf width 6-7 microns which has been achieved by a green laser with newly designed optics.
Figure 13:
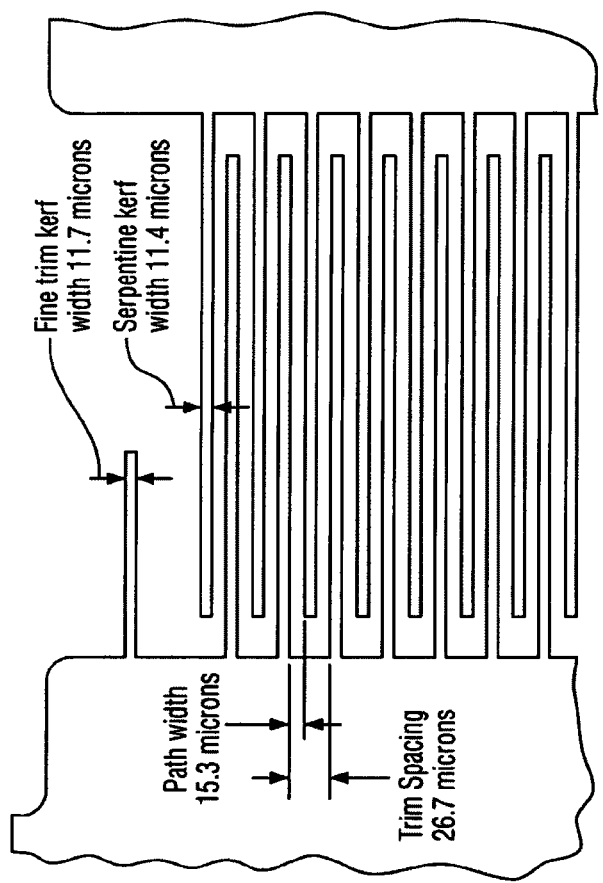
FIG. 13 is a view of a chip resistor trimmed by a green laser.

Kerf width as small as 6 microns has been achieved with newly design optics, shown in FIG. 12. Typically, a kerf width around 12 microns can handle chip size down to 0402 and 0201. FIG. 13 shows a 0402 resistor processed by a green laser.

Microcracking in cuts by UV lasers can be extended inside the film causing R and TCR drifts. It becomes more severe and pronounced in the newer 0402 and 0201 chip resistors due to thinner substrate used. Microcracking propagates and results in catastrophic failure in the substrate. Therefore, it is apparent that when the laser wavelength becomes too short, for example, into the UV region, the UV processing has the disadvantages of microcracking and instability caused by the cracking (i.e., drifts in R and TCR due to the cracking and its propagation in the film material).

Beam homogenization of a UV beam has been proposed (U.S. Pat. No. 6,534,743). According to this patent, it reduces the number of microcracks, but does not completely eliminate microcracking.

In addition, UV lasers are intrinsically less stable due to the need of two non-linear crystals rather than one. Therefore, UV lasers are more expensive than green lasers. Other disadvantages of UV lasers for resistor trimming include substrate damage and sensitivity to beam profile, that make the process unstable.

Figure 11:
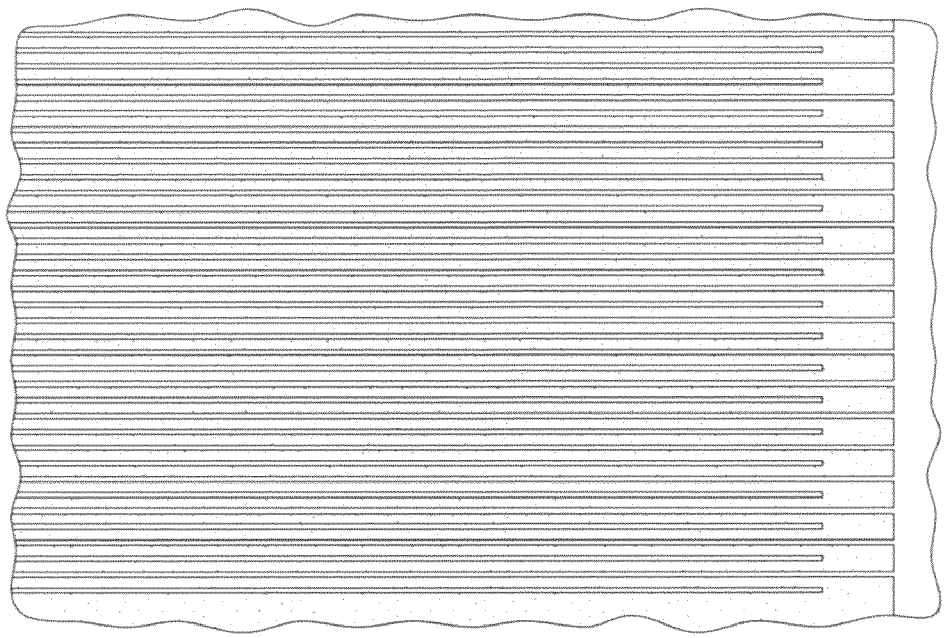
FIG. 11 is a view of a thin film resistor processed by a green laser.

Data shown herein indicates that there is no advantage by using UV lasers in trimming these chip resistors. Green lasers have achieved as small kerfs and TCR as UV lasers can. Shown in FIG. 11 is the part processed by a green laser.

With this new capability of 6 micro kerf, there is no doubt that the green laser wavelength is short enough to process any future chip resistors from the optical point of view of small spot size.

Therefore, green lasers with a Gaussian beam shape have every advantage of UV lasers have without the risks associated with UV laser processing like microcracking and instability.

The preferred wavelength should be just short enough to produce the desirable benefits of short wavelengths like smaller spot sizes, tight tolerance and high absorption, but not too short to cause microcracking.

Various embodiments of the present invention will also generally avoid substantial increases in capital and operating costs, process instability, complexity and instability. By way of example, such benefits of the present invention result from avoidance of UV wavelengths (so short to cause substantial microcracking) and the associated optical components hardware for $3^{rd}$ harmonic generation. Further, auxiliary beam shaping optics for producing a uniform spot distribution are not required when practicing embodiments of the present invention.

Therefore, the purpose in one embodiment of this invention is the use of a green laser for the trimming.

Figure 14:
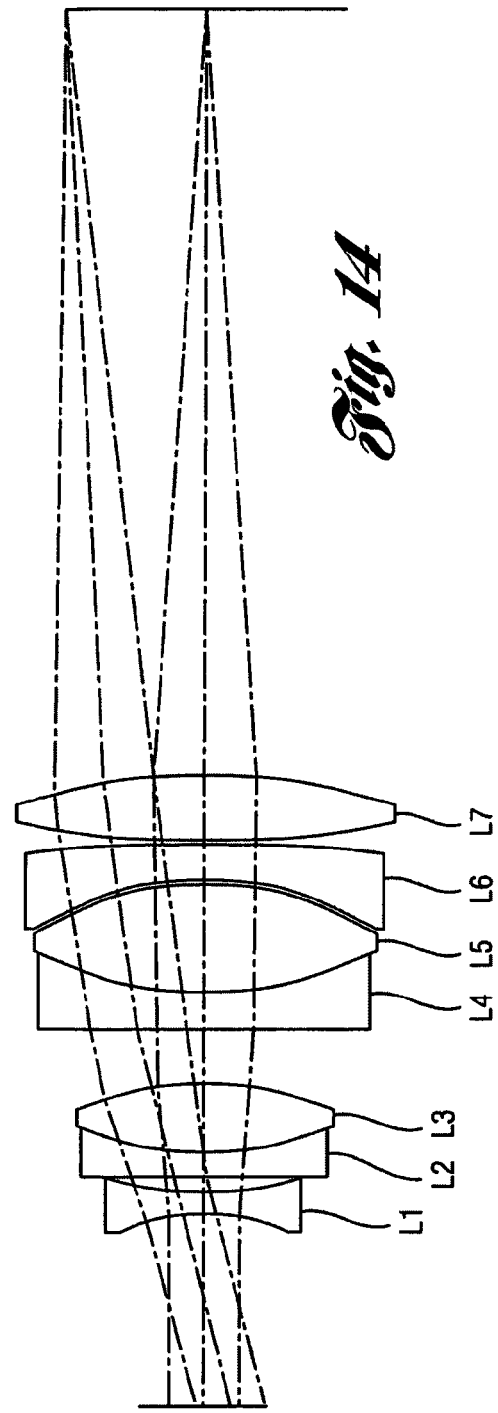
FIG. 14 is a 3D layout view of an 8 micron Green/IR scan lens for use in one embodiment of a laser system of the present invention.

Some features of this embodiment are:
1. The use of a green laser to laser-trim to achieve the small spot size and high absorption needed for processing smaller chip sizes, but to avoid the possibility of generating microcracking and damage to the substrate.
2. The use of newly designed optics for the green wavelength as a means to materialize the green laser processing capability. The optics are described in greater detail hereinbelow taken together with FIG. 14.

3. The use of a high precision beam positioning system as a means to materialize the green laser processing capability.
4. The use of a trimming system measuring and testing a subsystem as a means to materialize the green laser processing capability.

It is desirable for a thin film hybrid trim system to have a scan field encompassing a scan area of about 25 mm×50 mm with a spot size with a green laser less than 20 microns, preferably the spot size is less than 12 microns, most preferably a spot of 8 microns or less with about 7000 spots across the field diameter; and have a viewing channel with a bandwidth of at least 40 nm, preferably 100 nm, and most preferably >100 nm. The viewing channel may be a portion of the white light spectrum above about 550 nm selected with a band pass or high pass optical filter. The viewing channel may be selected by the emission spectrum of an LED illuminator. It is also desirable for scan lens producing an 8 micron green spot at 532 nm across the field to also produce a spot at 1.064 microns of about 17 microns across the field.

To meet the requirements of a scan area of 25 mm×50 mm, an 8 micron spot at 532 nm, a 17 micron spot at 1.064 nm with a selected viewing channel, the following lens form has been found to be effective.

It is to be understood that elements described as having plano surfaces and may be true planar surfaces, or approximately planar with curved surfaces having relatively long radii that do not contribute substantial optical power.

A multiple element achromatic scan lens comprising in succession from a side of incident light:
With $n_2 < n_3$
And $v_2 > v_3$
Preferred Solution (Shown in FIG. 14)
A first bi-concave element (L1)
A first cemented doublet including plano-concave and bi-convex elements (L2, L3), the cemented surface concave away from the incident light
A second cemented doublet including plano-concave and bi-convex elements (L4, L5), the cemented surface concave away from the incident light
A first negative meniscus element concave toward the incident light (L6)
A first bi-convex element (L7)
Triplet Solution
With the airspace L5/L6 removed to create a triplet:
A first bi-concave element (L1)
A first cemented doublet including plano-concave and bi-convex elements (L2, L3), the cemented surface concave away from the incident light
A first cemented triplet including plano-concave, bi-convex elements, negative meniscus element (L4, L5, L6), the first cemented surface concave away from the incident light
A first bi-convex element (L7)
6 Element Solution
With L5 removed to create a 6 element design:
A first bi-concave element (L1)
A first cemented doublet including plano-concave and bi-convex elements (L2, L3), the cemented surface concave away from the incident light
A first plano-convex element (L4)
A first negative meniscus element concave toward the incident light (L6)
A first bi-convex element (L7)
Preferably L2 is an anomalous dispersion glass, for example KzFSN4

|    | Index                  | Dispersion  |
|----|------------------------|-------------|
| L1 | $n_1 > 1.58$           | $v_1 < 40$  |
| L2 | $1.85 > n_2 > 1.5$     | $v_2 < 50$  |
| L3 | $n_3 > 1.58$           | $v_3 < 40$  |
| L4 | $n_4 > 1.61$           | $v_4 < 35$  |
| L5 | $1.85 > n_5 > 1.5$     | $v_5 > 40$  |
| L6 | $n_6 > 1.61$           | $v_6 < 35$  |
| L7 | $1.85 > n_7 > 1.5$     | $v_7 > 40$  |

| | |
|---|---|
| Effective focal length | 110 mm |
| Entrance pupil diameter | 13.8 mm |
| Input beam $1/e^2$ diameter | 13.8 mm |
| Back working distance | 150 mm |
| Cutting Wavelength(s) | 532 nm, 1.064 μm |
| Spot size $1/e^2$ diameter | at .532 μm, 8 μm |
| Spot size $1/e^2$ diameter | at 1.064 μm, 17 μm |
| Field angle | 15° |
| Field size | 25 mm × 50 mm |
| Telecentricity | <30° |
| Spot roundness | ≧90% |

Green/IR Scan Lens with Through-the-Lens Viewing

Glass Data:

|    | Index | Dispersion      |
|----|-------|-----------------|
| L1 | 1.65  | 33.8            |
| L2 | 1.61  | 44.3 anomalous  |
| L3 | 1.81  | 25.4            |
| L4 | 1.81  | 25.4            |
| L5 | 1.69  | 53.3            |
| L6 | 1.81  | 25.4            |
| L7 | 1.62  | 56.9            |

The preferred lens can be made by various optical manufacturing vendors including Special Optics, Inc., according to the following production specification:

| Surf | Type | Radius | Thickness | Glass | Diameter |
|---|---|---|---|---|---|
| OBJ | STANDARD | Infinity | Infinity | | 0 |
| STO | STANDARD | Infinity | 0 | | 13.8 |
| 0 | | | | | |
| 2 | COORDBRK | — | 19.05 | | — |
| 3 | COORDBRK | — | 18.288 | | — |
| 4 | STANDARD | −44.21 | 5 | SF2 | 32 |
| 5 | STANDARD | 110.456 | 2.452387 | | 38 |
| 6 | STANDARD | Infinity | 5 | KZFSN4 | 39 |
| 7 | STANDARD | 66.522 | 0.03 | BK7 | 47 |
| 8 | STANDARD | 66.511 | 13 | SF6 | 47 |
| 9 | STANDARD | −66.511 | 11.81475 | | 49 |
| 10 | STANDARD | Infinity | 7 | SFL6 | 60 |
| 11 | STANDARD | 72.023 | 0.03 | BK7 | 64 |
| 12 | STANDARD | 72.041 | 21.5 | LAKN13 | 64 |
| 13 | STANDARD | −58.801 | 1.234915 | | 66 |
| 14 | STANDARD | −60.136 | 7.50409 | SF6 | 66 |
| 15 | STANDARD | −235.496 | 0.5 | | 70 |
| 16 | STANDARD | 224.044 | 12.5 | SK10 | 73 |
| 17 | STANDARD | −124.842 | 151.6795 | | 74 |
| IMA | STANDARD | Infinity | | | 56.73353 |

Lens Prescription or Production Specification

The traditional 1-micron laser wavelength may not be able to generate the small spot size, as well as the reduced heat affected zone (HAZ), necessary to allow very fine features to be trimmed, to maintain the stability of resistors, and to minimize the drift and the change in temperature coefficient of resistance (TCR). Traditionally, the wavelength of 1 micron has been used as it is the wavelength from a commonly used industrial laser based on Nd doped crystals. It also has the proper characteristics (power, repetition rate, beam quality, and material absorption at the wavelength) to be the choice. Recently, as the dimensions shrink and tolerances tighten, new materials emerge. The traditional 1-micron laser does not trim well on some of the new materials. Moreover, the trim quality and post trim stability can no longer meet the new requirement due to the thermal and optical effects of the 1 micron wavelength.

Shorter wavelengths have the advantages of being able to generate smaller beam and smaller kerf, thus allows smaller features to be trimmed. Since most materials absorb more strongly at shorter wavelengths than at 1 micron, less thermal effects will be expected. Therefore, heat effected zone at shorter wavelengths tend to be less. This will in turn give rise to less TCR drift, which is caused by the heat affected zone around the laser trimming kerf.

There are two groups of film technologies used for resistors, namely, thick film and thin film. Thick film technology uses screen print technology. Both conductors and resistors are ink printed onto a substrate. The typical thickness of the resistor film is 10-25 microns with resistive values ranging from 10 Ohms/Square to 100,000 Ohms/Square. Thin film technology uses a vapor deposition technique. Initially, the conductor and resistor films are deposited onto the substrate. Patterns are photo masked and chemically etched. The thin film thickness is less than a micron, usually between 10 to 100 nm. The substrate can be glass, ceramic, or silicon. The thin film resistive values usually range from 100 Ohms/Square to 1,000 Ohms/Square depending on the materials. The most common thin film materials are Nichrome, SiChrome and Tantulum Nitride.

In order to understand the benefits of shorter wavelengths, an application study was conducted using both a traditional IR (1 micron) laser and a green (0.532 microns) laser. The samples were thin film chip resistors (Ni-Chrome). The initial value of the chip resistor is 180 Ohm+/−10%. The required final value after trim: 10 k Ohm with 0.1% tolerance and with a minimum TCR drift (<7%) after trim.

The laser trimming system includes a laser source, an optical beam delivery system with high speed galvanometers and a machining head. The laser sources give both 1.064 microns and 0.532 microns. The trimming method used was serpentine. Confirmed measurements include TRC measurement before and after trim off line. The actual power on targets are 35 mw and 30 mw for 1.064 microns and 0.532 microns, respectively. The kerfs observed on samples were 20 microns and 13 microns, respectively.

The final results and TCR are shown in Table 1. Table 2 summarizes the tolerance results for the green laser.

TABLE 1

Final results by 1.064- and 0.532 micron lasers on thin film chip resistors.

| Lasers | Initial Value (Ohm) | Final Value (Kohm) | Multiplier | VCR Before Trim (ppm) | TCR After Trim (ppm) | TCR Change | Power (mW) | Trim Width (micron) |
|---|---|---|---|---|---|---|---|---|
| 1.064 Micron Laser | 180 | 10 | 60 | −24 | −10 | 14 | 35 | 20 |
| 0.532 Micron Laser | 180 | 10 | 60 | −25 | −20 | 5 | 30 | 13 |

TABLE 2

Tolerance results measured 2 minutes after trim for the green laser.

| Low Limit | Up Limit | Number of Samples | Average | Max | Min | Standard Deviation |
|---|---|---|---|---|---|---|
| 9990.000 | 10010.000 | 224 | 9996.369 | 10004.400 | 9995.300 | 0.781 |

Compared to an IR laser, a cut by the green laser has narrower kerf and cleaner cut quality. No damage or micro-cracking were observed in the resistor.

The results show that thin film resistors trimmed by the green laser have already met the tough tolerance requirement, i.e., better than 0.1%. By reducing the wavelength from 1 micron to 0.5 microns, the spot size can be reduced by half as well. From an optical point of view, a 20-micron diameter beam at 1 micron wavelength is equivalent to 10 micron in diameter beam at 0.5 micron. This spot size reduction becomes more important as the size of resistors continue to shrink.

In addition, most of the thin and thick film materials have much stronger absorptions at green as compared to their absorptions at 1 micron. This results in better cutting quality, thus more stable results.

In order to get green light from Nd doped solid state lasers, a harmonic generator was used to convert the fundamental wavelength at 1 micron to the green. The material and the coatings for optics are very similar to those of 1 micron in terms of cost and lifetime. Therefore, the green laser is still a reliable and cost effective laser source for the manufacturing process.

In conclusion, green lasers with smaller kerf (13 microns) and better absorption have demonstrated to be a very effective source to trim the high performance thin film chip resistors. Tolerance better than 0.1% has been achieved.

Figure 16A:
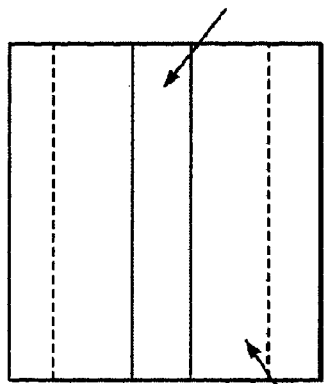
FIG. 16a is a top plan schematic view of a conventional laser trim with a relatively large HAZ.

It is one aspect of the invention to improve the post trim stability by reducing or eliminating the heat-affected zone (HAZ) along the trim path, as shown in FIG. 16*a*. In order to achieve that, non-conventional types of lasers—particularly fast rise/fall, pulse-shaped or an ultra-fast laser, or combination thereof, may be used for trimming. A beam shaping optics is also suggested to generate flat-top beam profile to reduce the HAZ along the trim path.

Figure 15:
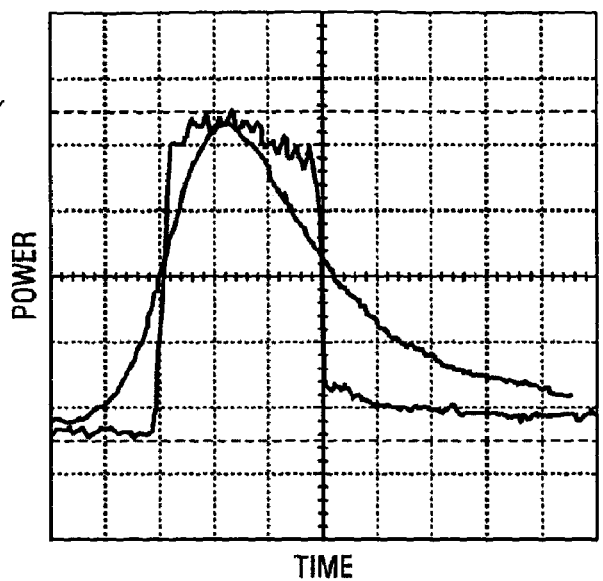
FIG. 15 are graphs of pulses generated by a fast rise/fall, pulse-shaped laser and a Gaussian-pulsed laser.

Referring now to FIG. 15, a fast rise/fall, pulse-shaped laser gives rise to more efficient process by better coupling the laser energy into the material. Fast fall time prevents excess energy from the tail of the typical q-switch pulse impinging the material. Therefore, less residual energy left for the neighboring zone near the trim path—thus less HAZ generated. A fast rise/fall, pulse-shaped laser may be used for trimming to reduce the post trim drift caused by the HAZ along the trim path.

Figure 16B:
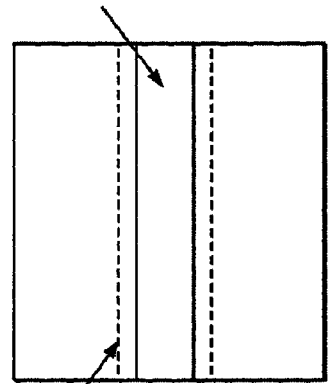
FIG. 16b is a top plan schematic view of an ultra-fast laser trim with little or no HAZ.

When the pulse width of the lasers is reduced, the thermally affected area, indicated by the thermal diffusion length is shortened. It has been shown that the diffusion length is proportional to the square root of the laser pulse width when the process is mainly thermal in nature. When the pulse duration is less that of the electron-photon interaction time constant, which is roughly a few pico-seconds depending on the specific material, the interaction becomes non-thermal in nature. The HAZ in this case will be eliminated. Ultra-fast lasers may be used for trimming to reduce or eliminate the post trim drift caused by the HAZ along the trim path, as shown in FIG. 16*b*.

Figure 17A:
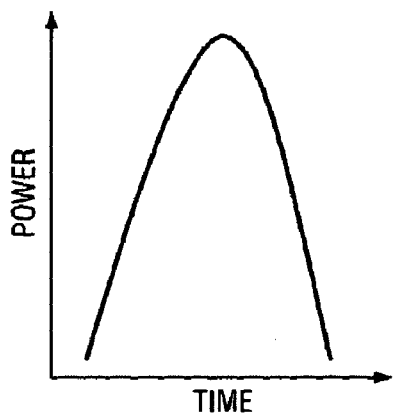
FIG. 17a is a graph of a pulse with a Gaussian profile.
Figure 17B:
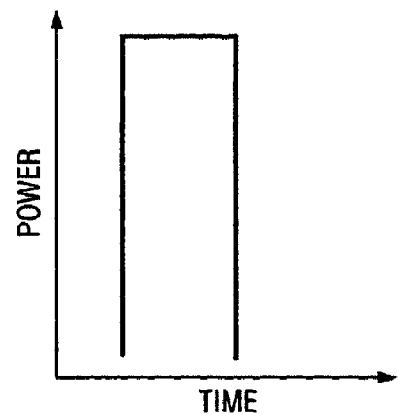
FIG. 17b is a graph of a pulse with a flat-top.

By spatially beam shaping the laser beam from the conventional Gaussian (i.e., FIG. 17*a*) to a flat-top (i.e., FIG. 17*b*), one would effectively reduce the spot size for trimming, thus reduce or eliminate the energy in the tail portion of the Gaussian beam, which is one of the main causes for heating up the surrounding area along the trim path. Because of the less energy left outside the trim kerf, less HAZ will be produced for the same total energy. A spatially shaped beam, preferably flat-top, may be used for trimming to reduce the post trim drift caused by the HAZ along the trim path.

A number of different laser types may be used in the method and system of the present invention. For example, the laser types disclosed in FIGS. 1-8 and corresponding text of U.S. Pat. No. 6,979,798, as well as FIGS. 6*a*-8*e* and the corresponding text of published U.S. patent application 2004/0134896 (i.e., all types of fiber and solid state lasers and their MOPA configurations) are most preferred.

Figure 18:
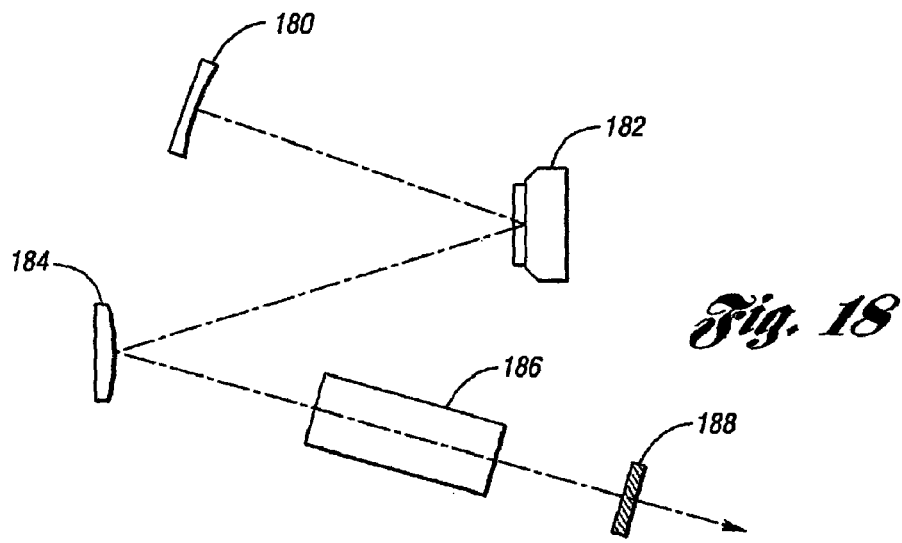
FIG. 18 is a block diagram schematic view of an example of a resonator design based on a disk laser for use in one embodiment of the present invention.
Figure 19:
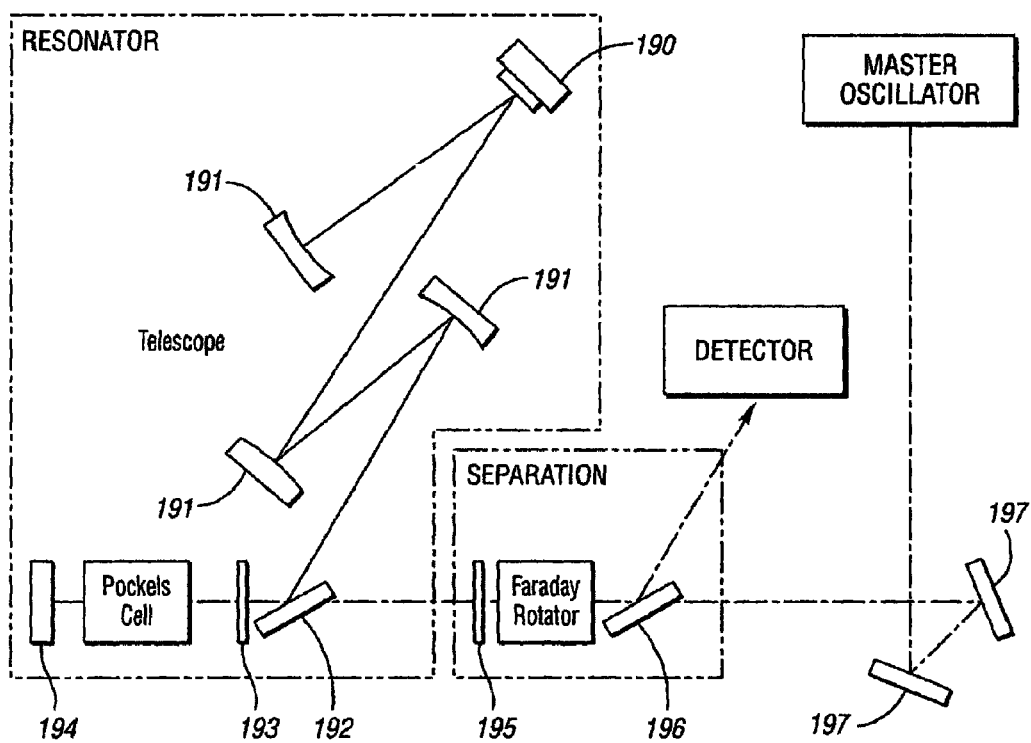
FIG. 19 is a block diagram schematic view of an example of a thin disk regenerative amplifier to use in one embodiment of the present invention.
Figure 20:
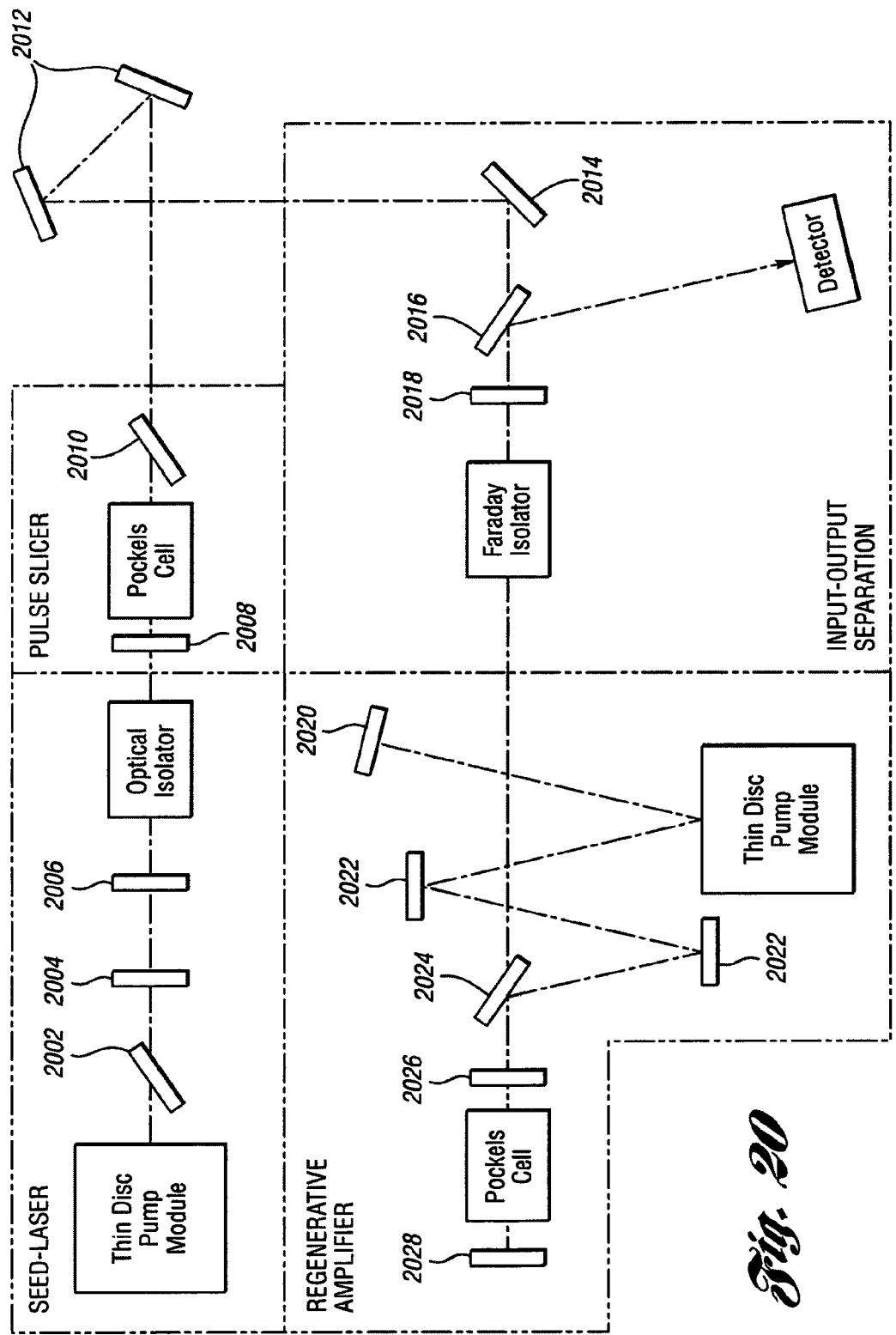
FIG. 20 is a block diagram schematic view of a typical system configuration of a regenerative thin disk amplifier for use in one embodiment of the present invention.

The following laser types may also be used as described with reference to FIGS. 18-20:

1. Q-switched thin disk laser. Such a laser can generate short pulses in the ns range (typical 1-30 ns) and has all of the advantages of a disk laser. An example of a resonator design based on a disk laser is illustrated in FIG. 18 and includes a mirror 180 (HR, R=5000 mm), Yb: YAG disk on heat sink 182, a mirror 184 (HR, R=−33000 mm), an AOM 186 and element 188 (T=10%, plane). In this example, crystal thickness is 150 μm, pumped diameter is 2.2 mm and cavity length is 840 mm.

2. Regenerative thin disk amplifier. A typical system configuration is shown in FIG. 20 and comprises:
 a) a seed-laser including a thin disk pump module, a Lyot-Filter 2002, an etalon 2004, an output coupler 2006 and an optimal isolator;
 b) a pulse slicer including a λ/2 plate 2008, a Pockels cell and a TFP 2010;
 c) a pair of mirrors 2012; and
 d) an input-output separation module or unit including a mirror 2014, a TFP 2016, a detector which detects an output beam, a λ/2 plate 2018 and a Faraday isolator; and
 e) a regenerative amplifier including a TFP 2024, mirrors 2022, a thin disk pump module, an end mirror 2020, a λ/4 plate 2026, a Pockels cell and an end mirror 2028.

3. Disk-based ultrafast laser. An example is Yb:YAG passively mode-locking oscillator which will give 16.2 watts with a 730 fs pulse pulse width at 34.6 MHZ and described in OPTICS LETRERS, 25, 859 (2000). Another example is a thin disk regenerative amplifier such as illustrated in FIG. 19. A seed laser may be used as the master oscillator which could be a disk laser itself as described immediately above or other type of ultrafast laser source. This arrangement gives high pulse energy at ultrafast pulse widths. An example of a thin disk regenerative amplifier is shown in FIG. 19 and comprises:
 a) the master oscillator;
 b) mirrors 197;
 c) a separation module or unit including a polarizer 196, a detector for detecting an output beam from the polarizer 196, a Faraday rotator and a λ/2 plate 195; and
 d) a resonator unit or module including a thin disk mounted on a heat sink 190, mirrors 191, a polarizer 192, a λ/4 plate 193, a Pockels cell and a mirror 194.

When an ultra-short pulse propagates through a transparent medium, such as a window or even air, it will get stretched in time due to the dispersion of the material. When focusing ultra-broadband femtosecond pulses, the compensation of the dispersion of the lenses has to be provided in order to get the best solution to focus ultra-short pulses to a small and undistorted spot size. The ability to control dispersion effects is significantly important for all applications requiring ultra-short (femto-second) laser pulses. Therefore, optical elements in the system beam delivery system have to be carefully designed and chosen in order to have minimal phase distortion and therefore optimum dispersion performance. These dispersion compensated or controlled optical elements, e.g., turning mirrors, beam splitters, lenses, prisms, etc., are commercially available. One of the suppliers is Femtolasers Produktions GmbH, Vienna, Austria.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for high-speed, laser-based, precise laser trimming at least one electrical element having at least one measurable property, the at least one element being supported on a substrate, the system comprising:
 a laser subsystem to generate a pulsed laser output having one or more laser pulses at a repetition rate, each laser pulse having a pulse energy, a visible laser wavelength, and a pulse duration;
 a beam delivery subsystem that accepts the pulsed laser output and includes:
  at least one beam deflector to position the one or more laser pulses relative to the at least one element to be trimmed; and
  an optical subsystem to focus the one or more laser pulses having the visible laser wavelength into at least one spot within a field of the optical subsystem; the at least one spot having a non-uniform intensity profile along a direction and a spot diameter less than about 15 microns; and
 a controller coupled to the beam delivery and laser subsystems to control the beam delivery and laser subsystems to selectively irradiate the at least one element such that the one or more laser output pulses having the visible laser wavelength, the pulse duration, the pulse energy and the spot diameter selectively remove material from the at least one element and laser trim the at least one element along a trim path while avoiding substantial microcracking within the at least one element, the laser wavelength being short enough to produce desired short-wavelength benefits of small spot size, tight tolerance, high absorption and reduced or eliminated heat-affected zone (HAZ) along the trim path, but not so short so as to cause microcracking.

2. The system as claimed in claim 1, wherein focused pulsed laser output power corresponds to about 10-50 mw with a spot diameter of less than about 15 μm, the power being scalable with reduced spot sizes less than about 15 μm such that corresponding power density is high enough to trim the element but sufficiently low to avoid microcracking.

3. The system as claimed in claim 1, wherein the laser subsystem includes a q-switched, frequency-doubled, solid state laser having a fundamental wavelength in the range of about 1.047 microns to 1.32 microns, and the visible output wavelength is a frequency-doubled wavelength in a visible wavelength range of about 0.5 microns to about 0.7 microns.

4. The system as claimed in claim 1, wherein the spot diameter is as small as about 6 microns to about 10 microns.

5. The system as claimed in claim 1, wherein the optical subsystem includes a lens that is achromatized at two or more wavelengths, at least one of the wavelengths being a visible wavelength.

6. The system as claimed in claim 5, further comprising:
an illuminator to illuminate a substrate region with radiant energy at one or more illumination wavelengths; and
a detection device having sensitivity to the radiant energy at one of the illumination wavelengths wherein one of the two or more wavelengths is a visible laser wavelength and the other is the illumination wavelength.

7. The system as claimed in claim 1, wherein the optical subsystem is a telecentric optical subsystem.

8. The system as claimed in claim 7, wherein the telecentric optical subsystem includes a telecentric lens.

9. The system as claimed in claim 1, wherein the repetition rate is at least 10 Kilohertz.

10. The system as claimed in claim 1, wherein at least one laser pulse of the laser output has a picosecond or femtosecond pulse width.

11. The system as claimed in claim 1, wherein the focused spot diameter is about 6 microns to about 10 microns at any location within the field of the optical subsystem.

12. The system as claimed in claim 1, further comprising a calibration algorithm to adjust coordinates of material to be irradiated within the at least one element and to thereby precisely control a dimension of a region of material removal.

13. The system as claimed in claim 1, further comprising a machine vision subsystem including a vision algorithm to locate or measure at least one geometric feature of the at least one element.

14. The system as claimed in claim 13, wherein the vision algorithm includes edge detection and the at least one geometric feature are edges of the at least one element, the edges being used to determine width of the at least one element and to define a dimension for material removal.

15. The system as claimed in claim 1, wherein a material of the substrate is a semiconductor.

16. The system as claimed in claim 1, wherein a material of the substrate is a ceramic.

17. The system as claimed in claim 8, wherein a material of the substrate is glass.

18. The system as claimed in claim 1, wherein the at least one element includes a thin-film element.

19. The system as claimed in claim 18, wherein the thin-film element comprises at least one of NiChrome, SiChrome, and Tantulum Nitride.

20. The system as claimed in claim 1, wherein the at least one element is a thick-film element.

21. The system as claimed in claim 1, wherein the at least one element is trimmed to within a tolerance of 0.1% or better.

22. The system as claimed in claim 1, wherein an array of thin-film electrical elements is to be trimmed with the system and wherein the controller includes:
means to selectively micromachine an array element to vary a value of a measurable property;
means to suspend the selective micromachining while the selective micromachining is suspended;
means to selectively micromachine at least one other array element to vary a value of a measurable property; and
means to resume the selective micromachining to vary a measurable property of the array element until its value is within a desired range.

23. The system as claimed in claim 1, further comprising a user interface, and a software program coupled to the interface and the controller, the software program adapted to accept pre-trim target values for the at least one element and to limit an electrical output being applied to the at least one element based on the values.

24. The system as claimed in claim 1, wherein the laser is a fast rise/fall, pulse-shaped q-switched laser.

25. The system as claimed in claim 1, wherein the laser is a picosecond or femtosecond laser.

26. The system as claimed in claim 1, wherein the optical subsystem spatially shapes the one or more laser pulses to form one or more spatially shaped laser pulses which are focused into the at least one spot.

27. The system as claimed in claim 24, wherein the optical subsystem includes at least one dispersion-compensated optical element.

28. The system as claimed in claim 1, wherein TCR drift after trimming is less than about 5 ppm.

29. A system of high-speed, laser-based, precise laser trimming at least one electrical element having at least one measurable property, the at least one element being supported on a substrate, the system comprising:
means including a laser for generating a pulsed laser output, the output having one or more laser pulses at a repetition rate, each laser pulse has a pulse energy, a laser wavelength within a range of laser wavelengths, and a pulse duration; and
means for selectively irradiating the at least one electrical element with the one or more laser pulses focused into at least one spot having a non-uniform intensity profile along a direction and a spot diameter less than about 15 microns so as to cause the one or more laser pulses having the wavelength, energy, pulse duration and the spot diameter to selectively remove material from the at least one element and laser trim the at least one element along a trim path while avoiding substantial microcracking within the at least one element, the temporal characteristics of the one or more laser pulses producing desired benefits of small kerf size, tight tolerance, and reduced or eliminated heat-affected zone (HAZ) along the trim path.

30. The system as claimed in claim 29, wherein the laser includes a fiber laser.

31. The system as claimed in claim 30, wherein the means for generating the pulsed laser output includes a master-oscillator/power amplifier.

32. The system as claimed in claim 29, wherein the laser is a femtosecond or picosecond laser.

33. The system as claimed in claim 29, wherein the wavelength is a visible or near IR wavelength.

34. An achromatic scan lens having multiple elements, the lens being configured to provide:
  a scan field encompassing a scan area of about 25 mm×50 mm;
  a green wavelength laser spot size less than 20 microns to about 8 microns or less, wherein a scan field diameter measures up to about 7000 spots; and
  a viewing channel with a bandwidth of at least 40 nm to 100 nm or more, wherein each element of the lens is composed of a glass type having an index of refraction, $n_n$, and a dispersion, $v_n$;
  the scan lens comprising in succession from a side of incident light:
    a first bi-concave element (L1);
    a first cemented doublet including plano-concave and bi-convex elements (L2, L3), a cemented surface of the first cemented doublet being concave away from the incident light, wherein $n_2 < n_3$, $v_2 > v_3$, and $v_2$ represents an anomalous dispersion;
    a second cemented doublet including plano-concave and bi-convex elements (L4, L5), a cemented surface of the second cemented doublet being concave away from the incident light;
    a first negative meniscus element (L6) being concave toward the incident light;
    a first bi-convex element (L7); and
  wherein values of $n_n$ and $v_n$ for each glass element are characterized by the relationships:

|    | Index              | Dispersion     |
|----|--------------------|----------------|
| L1 | $n_1 > 1.58$       | $v_1 < 40$     |
| L2 | $1.85 > n_2 > 1.5$ | $v_2 < 50$     |
| L3 | $n_3 > 1.58$       | $v_3 < 40$     |
| L4 | $n_4 > 1.61$       | $v_4 < 35$     |
| L5 | $1.85 > n_5 > 1.5$ | $v_5 > 40$     |
| L6 | $n_6 > 1.61$       | $v_6 < 35$     |
| L7 | $1.85 > n_7 > 1.5$ | $v_7 > 40$.    |

35. The achromatic scan lens of claim 34 wherein airspace between the second cemented doublet (L4/L5) and the first negative meniscus element (L6) is set to zero thickness and elements L4, L5, and L6 form a triplet (L4/L5/L6).

36. The achromatic scan lens of claim 34 wherein the second cemented doublet (L4/L5) is replaced with a single element (L4).

37. The achromatic scan lens of claim 34 wherein values of $n_n$ and $v_n$ for each glass element are:

|    | Index        | Dispersion              |
|----|--------------|-------------------------|
| L1 | $n_1 = 1.65$ | $v_1 = 33.8$            |
| L2 | $n_2 = 1.61$ | $v_2 = 44.3$ anomalous  |
| L3 | $n_3 = 1.81$ | $v_3 = 25.4$            |
| L4 | $n_4 = 1.81$ | $v_4 = 25.4$            |
| L5 | $n_5 = 1.69$ | $v_5 = 53.3$            |
| L6 | $n_6 = 1.81$ | $v_6 = 25.4$            |
| L7 | $n_7 = 1.62$ | $v_7 = 56.9$.           |

* * * * *